United States Patent
Wei et al.

(10) Patent No.: US 12,166,547 B2
(45) Date of Patent: Dec. 10, 2024

(54) ENHANCED HYBRID CSI-RS FOR FD-MIMO

(71) Applicant: QUALCOMM Incorporated, San Diego, CA (US)

(72) Inventors: Chao Wei, Beijing (CN); Bo Chen, Beijing (CN); Liangming Wu, Beijing (CN); Jilei Hou, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 16/077,272

(22) PCT Filed: Mar. 10, 2017

(86) PCT No.: PCT/CN2017/076313
§ 371 (c)(1),
(2) Date: Aug. 10, 2018

(87) PCT Pub. No.: WO2017/162050
PCT Pub. Date: Sep. 28, 2017

(65) Prior Publication Data
US 2019/0036579 A1    Jan. 31, 2019

(30) Foreign Application Priority Data
Mar. 25, 2016 (WO) ................ PCT/CN2016/077430

(51) Int. Cl.
*H04B 7/0456* (2017.01)
*H04B 7/06* (2006.01)
(Continued)

(52) U.S. Cl.
CPC ......... *H04B 7/0469* (2013.01); *H04B 7/0486* (2013.01); *H04B 7/0617* (2013.01);
(Continued)

(58) Field of Classification Search
None
See application file for complete search history.

(56) References Cited

U.S. PATENT DOCUMENTS

2010/0214937 A1*  8/2010  Chen ..................... H04L 43/00
                                                           370/252
2012/0014349 A1   1/2012  Chung et al.
(Continued)

FOREIGN PATENT DOCUMENTS

CN    101931456 A    12/2010
CN    102265576 A    11/2011
(Continued)

OTHER PUBLICATIONS

3GPP TR 36.897: "3rd Generation Partnership Project; Technical Specification Group Radio Access Network; Study on Elevation Beamforming/Full-Dimension (FD) MIMO for LTE (Release 13)", 3GPP Draft; R1-153674, TP FOR TR 36 897 1.0.0—Clean Version, 3rd Generation Partnership Project (3GPP), Mobile Competence Centre; 650, Route Des Lucioles; F-06921 Sophia-Antipolis Cedex; France, Jun. 1, 2015 (Jun. 1, 2015), pp. 1-59, XP050982099, Retrieved from the Internet: URL: http://www.3gpp.org/ftp/tsg_ran/WG1_RL1/TSGR1_81/Docs/.
(Continued)

*Primary Examiner* — Jason E Mattis
*Assistant Examiner* — Bao G Nguyen
(74) *Attorney, Agent, or Firm* — Norton Rose Fulbright US LLP

(57) ABSTRACT

Enhanced hybrid channel state information (CSI) reference signal (CSI-RS) for full dimension multiple input, multiple output (FD-MIMO) is discussed in which a base station configures a first CSI-RS resource for non-precoded CSI-RS and a second CSI-RS resource for beamformed CSI-RS. The first and second CSI-RS resources are associated with the same CSI process in a hybrid CSI-RS operation. The UE
(Continued)

provides a first CSI report including a first rank and precoding matrix indicator (PMI) based on measurement of the non-precoded CSI-RS. The base station may use this first CSI process. CSI report for the beamforming of the beamformed CSI-RS. The UE further provides a second CSI report including a second rank, second PMI, and CQI based on measurement of the beamformed CSI-RS. Additional aspects may provide for a base station to aggregate multiple two-port CSI-RS resource configurations into a single multiport CSI-RS resource configuration that may be dynamically shared between different UEs.

17 Claims, 17 Drawing Sheets

(51) Int. Cl.
*H04L 1/00* (2006.01)
*H04L 5/00* (2006.01)

(52) U.S. Cl.
CPC ......... *H04B 7/0626* (2013.01); *H04B 7/0639* (2013.01); *H04B 7/0645* (2013.01); *H04L 1/0023* (2013.01); *H04L 5/0048* (2013.01); *H04L 5/0057* (2013.01); *H04L 5/0053* (2013.01)

(56) References Cited

U.S. PATENT DOCUMENTS

| | | | |
|---|---|---|---|
| 2012/0076028 A1* | 3/2012 | Ko | H04B 7/0626 370/252 |
| 2012/0220286 A1 | 8/2012 | Chen et al. | |
| 2013/0064196 A1 | 3/2013 | Gao et al. | |
| 2013/0329691 A1* | 12/2013 | Kim | H04L 5/001 370/329 |
| 2014/0269460 A1* | 9/2014 | Papasakellariou | H04L 5/0048 370/294 |
| 2015/0207604 A1* | 7/2015 | Sun | H04B 7/0626 370/329 |
| 2015/0237642 A1* | 8/2015 | Ihm | H04W 72/10 370/329 |
| 2015/0249998 A1* | 9/2015 | Long | H04W 72/085 370/329 |
| 2016/0269084 A1* | 9/2016 | Nam | H04B 7/0469 |
| 2016/0294526 A1* | 10/2016 | Kim | H04L 5/0073 |
| 2016/0359538 A1* | 12/2016 | Onggosanusi | H04B 7/0478 |
| 2017/0048740 A1* | 2/2017 | Yang | H04W 72/10 |
| 2017/0201308 A1* | 7/2017 | Park | H04W 16/14 |
| 2017/0237478 A1* | 8/2017 | Kwak | H04L 5/0094 370/329 |
| 2019/0036579 A1* | 1/2019 | Wei | H04L 5/0057 |
| 2019/0288812 A1* | 9/2019 | Chen | H04L 1/0003 |

FOREIGN PATENT DOCUMENTS

| | | |
|---|---|---|
| CN | 103069902 A | 4/2013 |
| KR | 20150070925 A | 6/2015 |
| WO | WO-2014139174 A1 | 9/2014 |
| WO | 2015093829 A1 | 6/2015 |
| WO | WO-2015184927 A1 | 12/2015 |

OTHER PUBLICATIONS

Huawei et al., "Beamformed CSI-RS Design", 3GPP Draft; R1-154349, 3rd Generation Partnership Project (3GPP), Mobile Competence Centre; 650, Route Des Lucioles F-06921 Sophia-Antipolis Cedex; France, vol. RAN WG1, No. Beijing, China; Aug. 24, 2015-Aug. 28, 2015, Aug. 23, 2015 (Aug. 23, 2015), 4 pages, XP051001664, Retrieved from the Internet: URL:http://www.3gpp.org/ftp/Meetings_3GPP_SYNC/RAN1/Docs/.
Supplementary Partial European Search Report—EP17769327—Search Authority—The Hague—Oct. 22, 2019.
Supplementary European Search Report—EP17769327—Search Authority—The Hague—Feb. 3, 2020.
Samsung: "Handling Collision Between NonPrecoded Type and Beamformed Type CSI Reports", 3GPP Draft, 3GPP TSG RAN WG1 Meeting #84, R1-160534 Priority Class A B, 3rd Generation Partnership Project (3GPP), Mobile Competence Centre, 650, Route Des Lucioles, F-06921 Sophia-Antipolis Cedex, France, vol. RAN WG1, No. St Julian's, Malta, Feb. 15, 2016-Feb. 19, 2016 Feb. 14, 2016 (Feb. 14, 2016), XP051053866, pp. 1-4, Retrieved from the Internet: URL:http://www.3gpp.org/ftp/Meetings_3GPP_SYNC/RAN1/Docs/ [retrieved on Feb. 14, 2016].
"Huawei., et al., "Discussion on Potential Enhancements on CSI Feedback Based on Hybrid Beamformed CSI-RS and Non-precoded CSI-RS Based Feedback Scheme," 3GPP TSG RAN WG1 Meeting #81, R1-152482, May 29, 2015, 2 pages.".
International Search Report and Written Opinion—PCT/CN2017/076313—ISA/EPO—May 31, 2017.
International Search Report and Written Opinion—PCT/CN2016/077430—ISA/EPO—Nov. 30, 2016.
Samsung: "Specification Impacts and Evaluation Results for Hybrid CSI-RS," 3GPP TSG RAN WG1 Meeting #81, R1-152886, May 25-29, 2015, 3 pages.

* cited by examiner

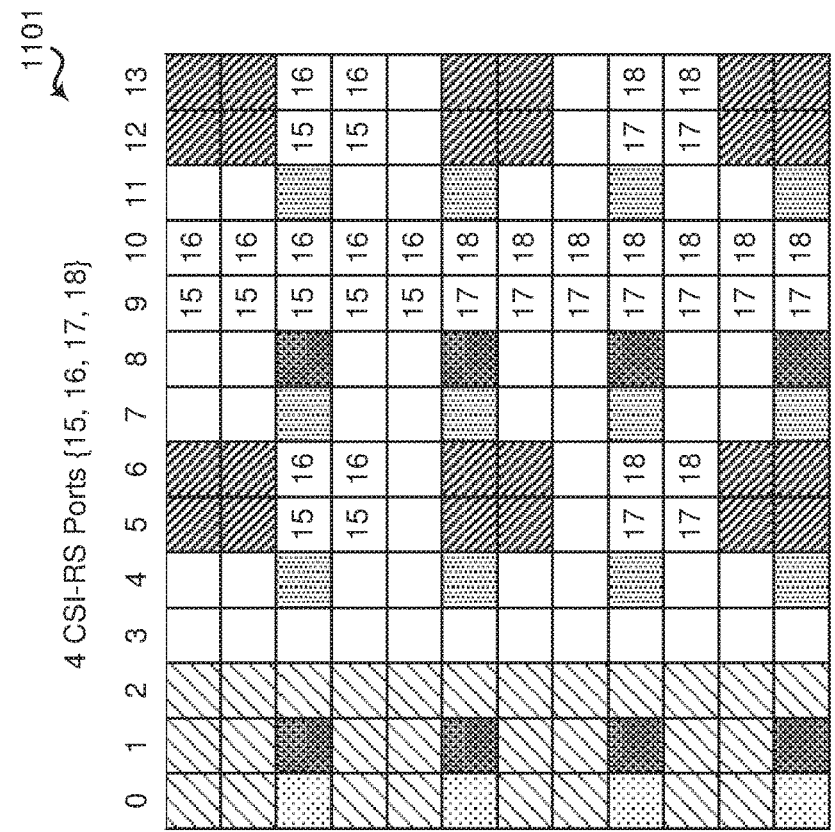
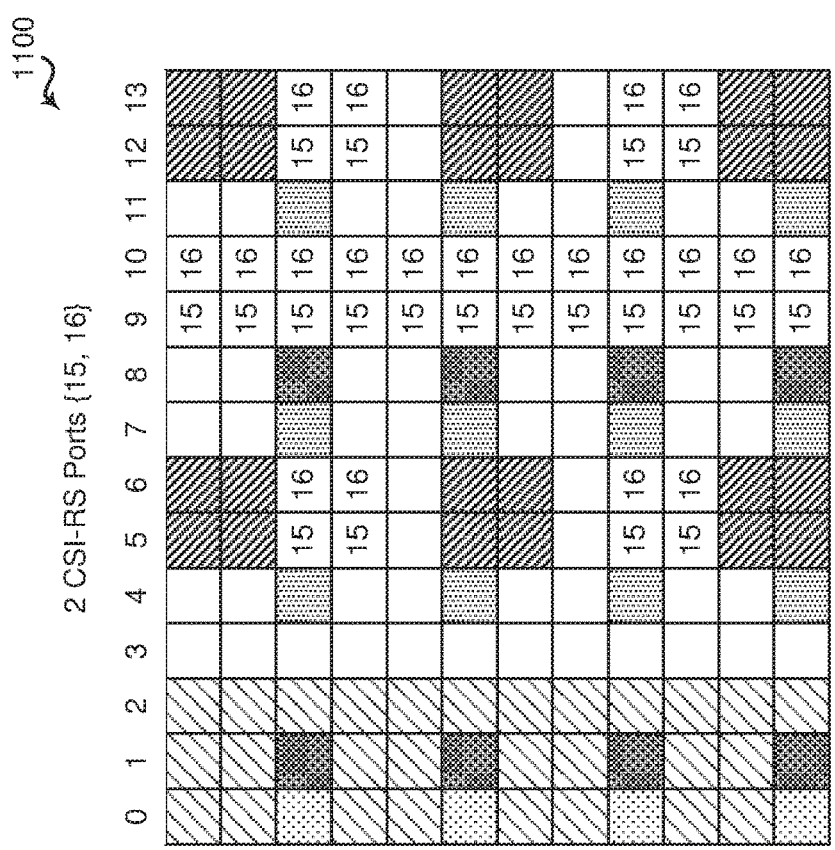
FIG. 11A
FIG. 11B

ENHANCED HYBRID CSI-RS FOR FD-MIMO

CROSS-REFERENCE TO RELATED APPLICATIONS

This application claims the benefit of PCT/CN2016/077430, entitled, "ENHANCED HYBRID CSI-RS FOR FD-MIMO," filed on Mar. 25, 2016, which is expressly incorporated by reference herein in its entirety.

BACKGROUND

Field

Aspects of the present disclosure relate generally to wireless communication systems, and more particularly, to enhanced hybrid channel state information (CSI) reference signal (CSI-RS) for full-dimensional (FD) multiple input, multiple output (MIMO).

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the disclosure, a method of wireless communication includes configuring a first channel state information (CSI) reference signal (CSI-RS) resource for non-precoded CSI-RS, wherein the first CSI-RS resource is associated with a CSI process, configuring a second CSI-RS resource for beamformed CSI-RS, wherein the second CSI-RS resource is also associated with the CSI process, and transmitting a non-precoded CSI-RS using the first CSI-RS resource and a beamformed CSI-RS using the second CSI-RS resource, wherein the transmitting is part of a hybrid CSI-RS operation.

In an additional aspect of the disclosure, a method of wireless communication includes generating a first rank indicator and a first precoding matrix indicator based on measurement of a first CSI-RS resource of a non-precoded CSI-RS in a CSI process, transmitting a first CSI report including one or more of: the first rank indicator and the first precoding matrix indicator, according to a first periodicity and offset, generating a second rank indicator, a second precoding matrix indicator, and a channel quality indicator based on measurement of a second CSI-RS resource of a beamformed CSI-RS in the CSI process, and transmitting a second CSI report including one or more of: the second rank indicator, the second precoding matrix indicator, and the channel quality indicator, according to a second periodicity and offset.

In an additional aspect of the disclosure, a method of wireless communication includes aggregating a plurality of two-port CSI-RS resource configurations into a single multiport CSI-RS resource configuration, and transmitting beamformed CSI-RS according to the single multiport CSI-RS resource configuration.

In an additional aspect of the disclosure, an apparatus configured for wireless communication includes means for configuring a first CSI-RS resource for non-precoded CSI-RS, wherein the first CSI-RS resource is associated with a CSI process, means for configuring a second CSI-RS resource for beamformed CSI-RS, wherein the second CSI-RS resource is also associated with the CSI process, and means for transmitting a non-precoded CSI-RS using the first CSI-RS resource and a beamformed CSI-RS using the second CSI-RS resource, wherein the transmitting is part of a hybrid CSI-RS operation.

In an additional aspect of the disclosure, an apparatus configured for wireless communication includes means for generating a first rank indicator and a first precoding matrix indicator based on measurement of a first CSI-RS resource of a non-precoded CSI-RS in a CSI process, means for transmitting a first CSI report including one or more of: the first rank indicator and the first precoding matrix indicator, according to a first periodicity and offset, means for generating a second rank indicator, a second precoding matrix indicator, and a channel quality indicator based on measurement of a second CSI-RS resource of a beamformed CSI-RS in the CSI process, and means for transmitting a second CSI report including one or more of: the second rank indicator, the second precoding matrix indicator, and the channel quality indicator, according to a second periodicity and offset.

In an additional aspect of the disclosure, an apparatus configured for wireless communication includes means for aggregating a plurality of two-port CSI-RS resource configurations into a single multiport CSI-RS resource configuration, and means for transmitting beamformed CSI-RS according to the single multiport CSI-RS resource configuration.

In an additional aspect of the disclosure, a non-transitory computer-readable medium having program code recorded thereon. The program code further includes code to configure a first CSI-RS resource for non-precoded CSI-RS, wherein the first CSI-RS resource is associated with a CSI process, code to configure a second CSI-RS resource for beamformed CSI-RS, wherein the second CSI-RS resource is also associated with the CSI process, and code to transmit a non-precoded CSI-RS using the first CSI-RS resource and a beamformed CSI-RS using the second CSI-RS resource, wherein the transmitting is part of a hybrid CSI-RS operation.

In an additional aspect of the disclosure, a non-transitory computer-readable medium having program code recorded thereon. The program code further includes code to generate a first rank indicator and a first precoding matrix indicator based on measurement of a first CSI-RS resource of a non-precoded CSI-RS in a CSI process, code to transmit a first CSI report including one or more of: the first rank indicator and the first precoding matrix indicator, according to a first periodicity and offset, code to generate a second rank indicator, a second precoding matrix indicator, and a channel quality indicator based on measurement of a second CSI-RS resource of a beamformed CSI-RS in the CSI process, and code to transmit a second CSI report including one or more of: the second rank indicator, the second precoding matrix indicator, and the channel quality indicator, according to a second periodicity and offset.

In an additional aspect of the disclosure, a non-transitory computer-readable medium having program code recorded thereon. The program code further includes code to aggregate a plurality of two-port CSI-RS resource configurations into a single multiport CSI-RS resource configuration, and code to transmit beamformed CSI-RS according to the single multiport CSI-RS resource configuration.

In an additional aspect of the disclosure, an apparatus configured for wireless communication is disclosed. The apparatus includes at least one processor, and a memory coupled to the processor. The processor is configured to configure a first CSI-RS resource for non-precoded CSI-RS, wherein the first CSI-RS resource is associated with a CSI process, to configure a second CSI-RS resource for beamformed CSI-RS, wherein the second CSI-RS resource is also associated with the CSI process, and to transmit a non-precoded CSI-RS using the first CSI-RS resource and a beamformed CSI-RS using the second CSI-RS resource, wherein the transmitting is part of a hybrid CSI-RS operation.

In an additional aspect of the disclosure, an apparatus configured for wireless communication is disclosed. The apparatus includes at least one processor, and a memory coupled to the processor. The processor is configured to generate a first rank indicator and a first precoding matrix indicator based on measurement of a first CSI-RS resource of a non-precoded CSI-RS in a CSI process, to transmit a first CSI report including one or more of: the first rank indicator and the first precoding matrix indicator, according to a first periodicity and offset, to generate a second rank indicator, a second precoding matrix indicator, and a channel quality indicator based on measurement of a second CSI-RS resource of a beamformed CSI-RS in the CSI process, and to transmit a second CSI report including one or more of: the second rank indicator, the second precoding matrix indicator, and the channel quality indicator, according to a second periodicity and offset.

In an additional aspect of the disclosure, an apparatus configured for wireless communication is disclosed. The apparatus includes at least one processor, and a memory coupled to the processor. The processor is configured to aggregate a plurality of two-port CSI-RS resource configurations into a single multiport CSI-RS resource configuration, and to transmit beamformed CSI-RS according to the single multiport CSI-RS resource configuration.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 11A-11C are block diagrams illustrating a resource element (RE) map for transmissions of 2-port, 4-port, and 8-port CSI-RS resources.

DETAILED DESCRIPTION

Figure 1:
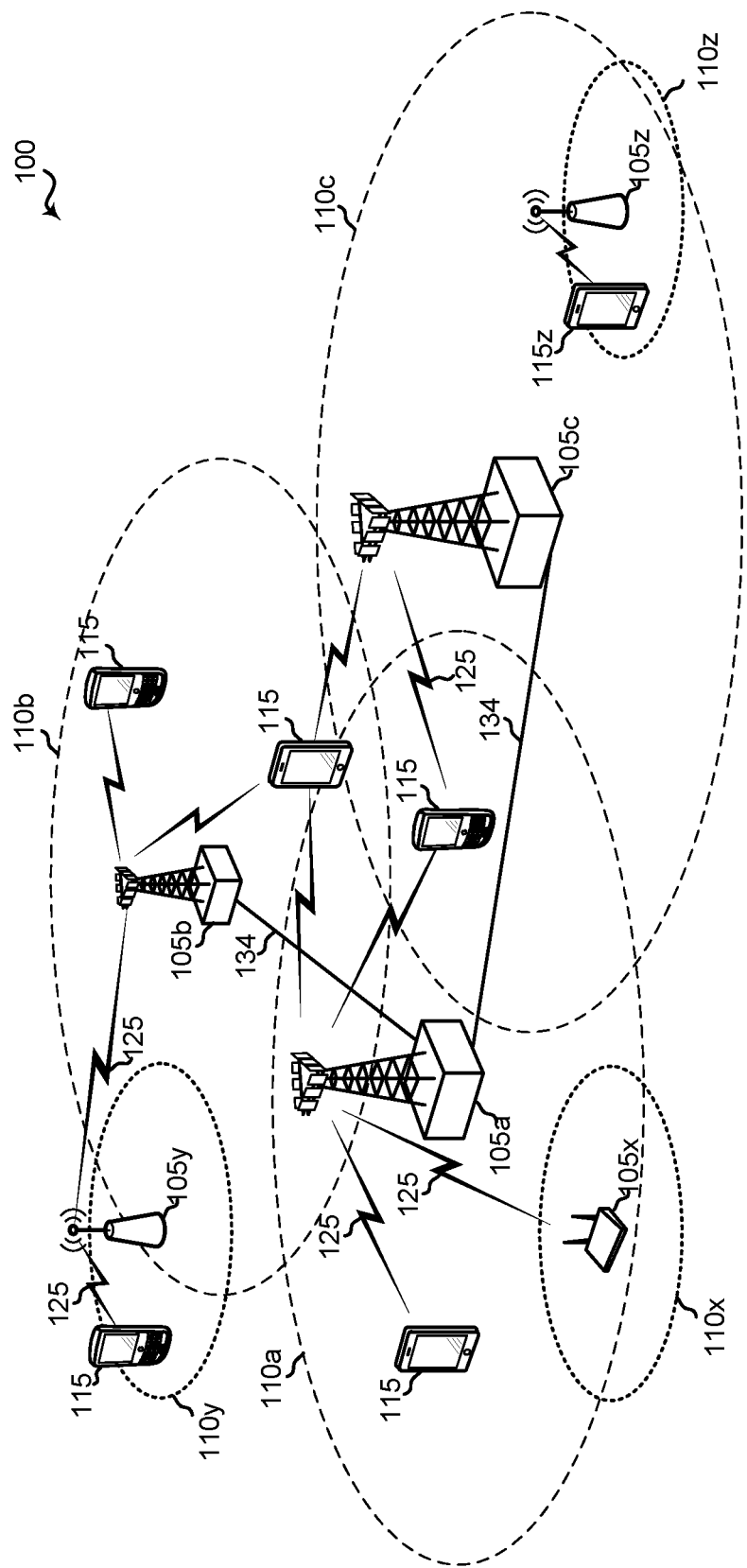
FIG. 1 is a block diagram illustrating details of a wireless communication system.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. For clarity, certain aspects of the apparatus and techniques may be described below for LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

A new carrier type based on LTE/LTE-A including in unlicensed spectrum has also been suggested that can be compatible with carrier-grade WiFi, making LTE/LTE-A with unlicensed spectrum an alternative to WiFi. LTE/LTE-A, when operating in unlicensed spectrum, may leverage LTE concepts and may introduce some modifications to physical layer (PHY) and media access control (MAC) aspects of the network or network devices to provide efficient operation in the unlicensed spectrum and meet regulatory requirements. The unlicensed spectrum used may range from as low as several hundred Megahertz (MHz) to as high as tens of Gigahertz (GHz), for example. In operation, such LTE/LTE-A networks may operate with any combination of licensed or unlicensed spectrum depending on loading and availability. Accordingly, it may be apparent to one of skill in the art that the systems, apparatus and methods described herein may be applied to other communications systems and applications.

System designs may support various time-frequency reference signals for the downlink and uplink to facilitate beamforming and other functions. A reference signal is a signal generated based on known data and may also be referred to as a pilot, preamble, training signal, sounding signal, and the like. A reference signal may be used by a receiver for various purposes such as channel estimation, coherent demodulation, channel quality measurement, signal strength measurement, and the like. MIMO systems using multiple antennas generally provide for coordination of sending of reference signals between antennas; however, LTE systems do not in general provide for coordination of sending of reference signals from multiple base stations or eNB s.

In some implementations, a system may utilize time division duplexing (TDD). For TDD, the downlink and uplink share the same frequency spectrum or channel, and downlink and uplink transmissions are sent on the same frequency spectrum. The downlink channel response may thus be correlated with the uplink channel response. Reciprocity may allow a downlink channel to be estimated based on transmissions sent via the uplink. These uplink transmissions may be reference signals or uplink control channels (which may be used as reference symbols after demodulation). The uplink transmissions may allow for estimation of a space-selective channel via multiple antennas.

In LTE implementations, orthogonal frequency division multiplexing (OFDM) is used for the downlink—that is, from a base station, access point or eNodeB (eNB) to a user terminal or UE. Use of OFDM meets the LTE requirement for spectrum flexibility and enables cost-efficient solutions for very wide carriers with high peak rates, and is a well-established technology. For example, OFDM is used in standards such as IEEE 802.11a/g, 802.16, High Performance Radio LAN-2 (HIPERLAN-2, wherein LAN stands for Local Area Network) standardized by the European Telecommunications Standards Institute (ETSI), Digital Video Broadcasting (DVB) published by the Joint Technical Committee of ETSI, and other standards.

Time frequency physical resource blocks (also denoted here in as resource blocks or "RBs" for brevity) may be defined in OFDM systems as groups of transport carriers (e.g. sub-carriers) or intervals that are assigned to transport data. The RBs are defined over a time and frequency period. Resource blocks are comprised of time-frequency resource elements (also denoted here in as resource elements or "REs" for brevity), which may be defined by indices of time and frequency in a slot. Additional details of LTE RBs and REs are described in the 3GPP specifications, such as, for example, 3GPP TS 36.211.

UMTS LTE supports scalable carrier bandwidths from 20 MHz down to 1.4 MHZ. In LTE, an RB is defined as 12 sub-carriers when the subcarrier bandwidth is 15 kHz, or 24 sub-carriers when the sub-carrier bandwidth is 7.5 kHz. In an exemplary implementation, in the time domain there is a defined radio frame that is 10 ms long and consists of 10 subframes of 1 millisecond (ms) each. Every subframe consists of 2 slots, where each slot is 0.5 ms. The subcarrier spacing in the frequency domain in this case is 15 kHz. Twelve of these subcarriers together (per slot) constitute an RB, so in this implementation one resource block is 180 kHz. Six Resource blocks fit in a carrier of 1.4 MHz and 100 resource blocks fit in a carrier of 20 MHz.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 shows a wireless network 100 for communication, which may be an LTE-A network. The wireless network 100 includes a number of evolved node Bs (eNBs) 105 and other network entities. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, the eNBs 105a, 105b and 105c are macro eNBs for the macro cells 110a, 110b and 110c, respectively. The eNBs 105x, 105y, and 105z are small cell eNBs, which may include pico or femto eNBs that provide service to small cells 110x, 110y, and 110z, respectively. An eNB may support one or multiple (e.g., two, three, four, and the like) cells.

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Wired backhaul communication 134 indicate wired backhaul communications that may occur between eNBs.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (X) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (X) may be dependent on the system bandwidth. For example, X may be equal to 72, 180, 300, 600, 900, and 1200 for a corresponding system bandwidth of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.4, 3, 5, 10, 15, or 20 MHz, respectively.

Figure 2:
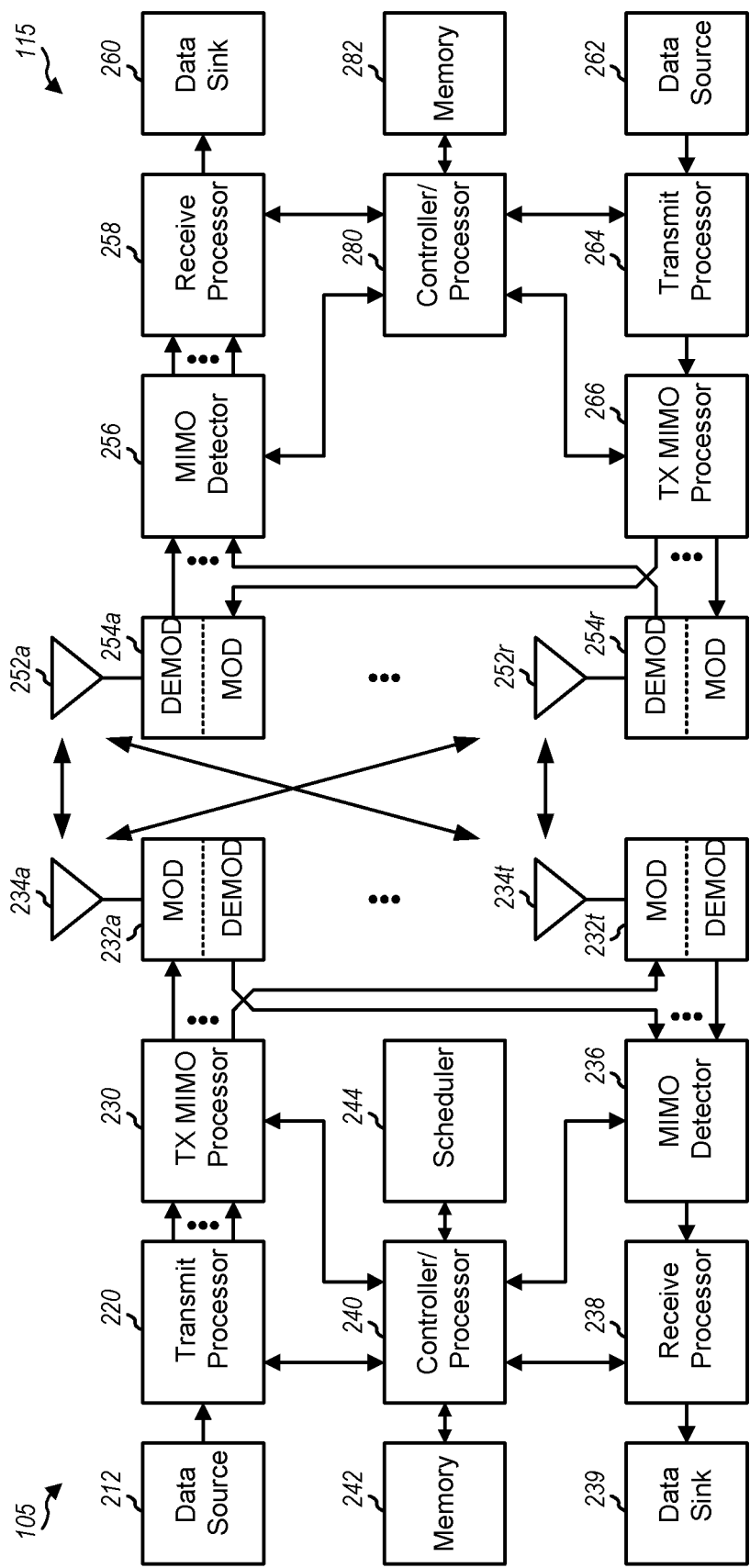
FIG. 2 is a block diagram conceptually illustrating a design of a base station/eNB and a UE configured according to one aspect of the present disclosure.

FIG. 2 shows a block diagram of a design of a base station/eNB 105 and a UE 115, which may be one of the base stations/eNBs and one of the UEs in FIG. 1. For a restricted association scenario, the eNB 105 may be the small cell eNB 105*z* in FIG. 1, and the UE 115 may be the UE 115*z*, which in order to access small cell eNB 105*z*, would be included in a list of accessible UEs for small cell eNB 105*z*. The eNB 105 may also be a base station of some other type. The eNB 105 may be equipped with antennas 234*a* through 234*t*, and the UE 115 may be equipped with antennas 252*a* through 252*r*.

At the eNB 105, a transmit processor 220 may receive data from a data source 212 and control information from a controller/processor 240. The control information may be for the PBCH, PCFICH, PHICH, PDCCH, etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a* through 232*t*. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232*a* through 232*t* may be transmitted via the antennas 234*a* through 234*t*, respectively.

At the UE 115, the antennas 252*a* through 252*r* may receive the downlink signals from the eNB 105 and may provide received signals to the demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254*a* through 254*r*, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254*a* through 254*r* (e.g., for SC-FDM, etc.), and transmitted to the eNB 105. At the eNB 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the eNB 105 and the UE 115, respectively. The controller/processor 240 and/or other processors and modules at the eNB 105 may perform or direct the execution of various processes for the techniques described herein. The controllers/processor 280 and/or other processors and modules at the UE 115 may also perform or direct the execution of the functional blocks illustrated in FIGS. 6A, 6B, 9, 12, and/or other processes for the techniques described herein. The memories 242 and 282 may store data and program codes for the eNB 105 and the UE 115, respectively. A scheduler 244 may schedule UEs for data transmission on the downlink and/or uplink.

Multiple-input multiple-output (MIMO) technology generally allows communication to take advantage of the spatial dimension through use of channel state information (CSI) feedback at the eNB. An eNB may broadcast cell-specific CSI reference signals (CSI-RS) for which the UE measures CSI based on configurations signaled by eNB via RRC, such as CSI-RS resource configuration and transmission mode. The CSI-RS are periodically transmitted at periodicities of 5, 10, 20, 40, 80 ms, or the like. A UE may report CSI at CSI reporting instances also configured by the eNB. As a part of CSI reporting the UE generates and reports channel quality indicator (CQI), precoding matrix indicator (PMI), and rank indicator (RI). The CSI can be reported either via PUCCH or via PUSCH and may be reported either periodically or aperiodically, with potentially different granularity. When reported via PUCCH, the payload size for CSI may be limited.

In order to increase system capacity, full-dimensional (FD)-MIMO technology has been considered, in which an eNB uses a two-dimensional (2D) active antenna array with a large number of antennas with antenna ports having both horizontal and vertical axes, and has a larger number of transceiver units. For conventional MIMO systems, beamforming has typically implemented using only azimuth dimension, although of a 3D multi-path propagation. However, for FD-MIMO each transceiver unit has its own independent amplitude and phase control. Such capability together with the 2D active antenna array allows the transmitted signal to be steered not only in the horizontal direction, as in conventional multi-antenna systems, but also simultaneously in both the horizontal and the vertical direction, which provides more flexibility in shaping beam directions from an eNB to a UE. Providing dynamic beam steering in the vertical direction has been shown to result in significant gain in interference avoidance. Thus, FD-MIMO technologies may take advantage of both azimuth and elevation beamforming, which would greatly improve MIMO system capacity and signal quality.

Figure 3:
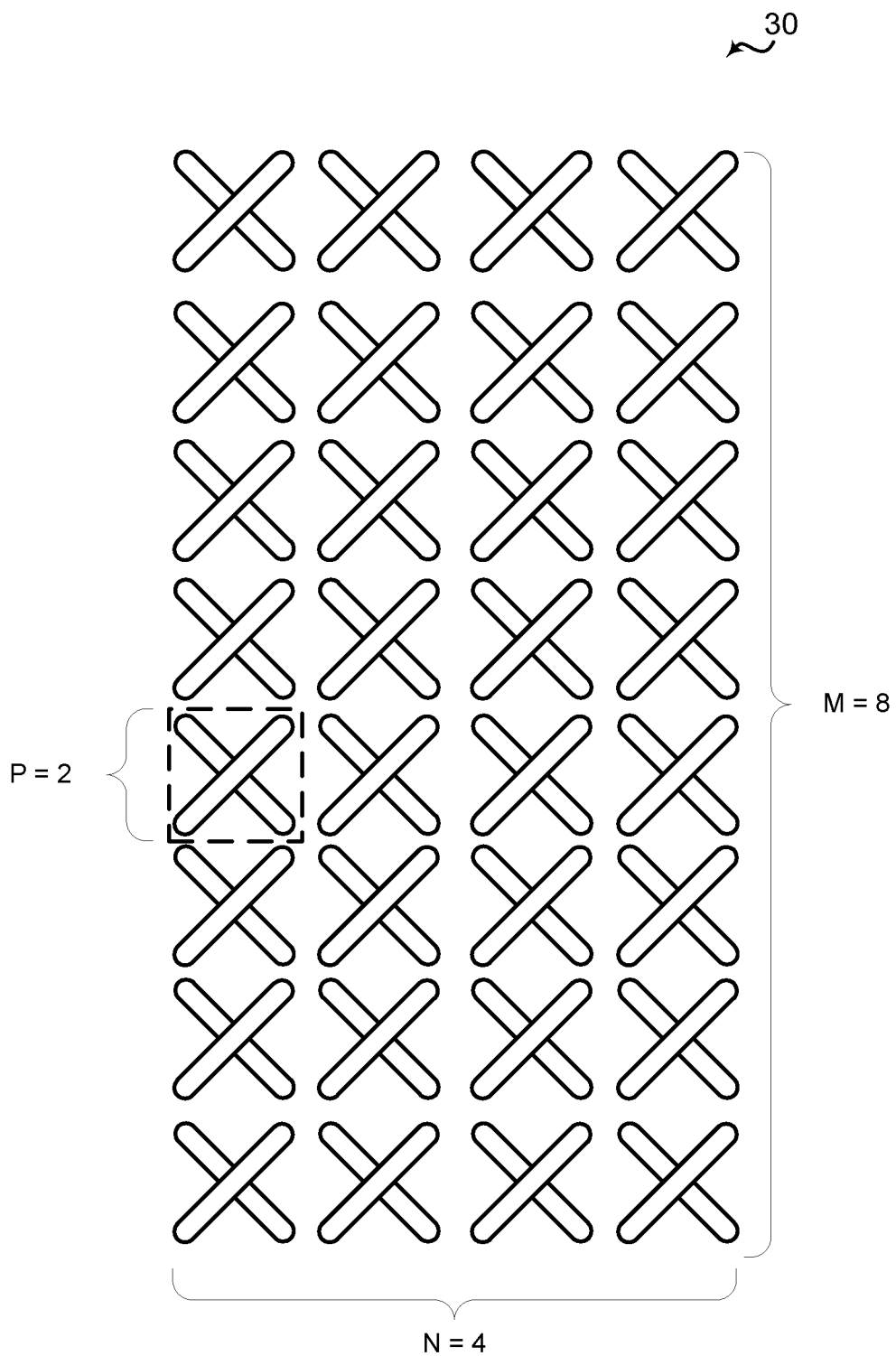
FIG. 3 is a block diagram illustrating a typical 2D active antenna array.

FIG. 3 is a block diagram illustrating a typical 2D active antenna array 30. Active antenna array 30 is a 64-transmitter, cross-polarized uniform planar antenna array comprising four columns, in which each column includes eight cross-polarized vertical antenna elements. Active antenna arrays are often described according to the number of antenna columns (N), the polarization type (P), and the number of vertical elements having the same polarization type in one column (M). Thus, active antenna array 30 has four columns (N=4), with eight vertical (M=8) cross-polarized antenna elements (P=2).

For a 2D array structure, in order to exploit the vertical dimension by elevation beamforming the CSI is needed at the base station. The CSI, in terms of PMI, RI, and CQI, can be fed back to the base station by a mobile station based on downlink channel estimation and predefined PMI codebook(s). However, different from the conventional MIMO system, the eNB capable of FD-MIMO is typically equipped with a large scale antenna system and, thus, the acquisition of full array CSI from the UE is quite challenging due to the complexity of channel estimation and both excessive downlink CSI-RS overhead and uplink CSI feedback overhead.

Figure 4A:
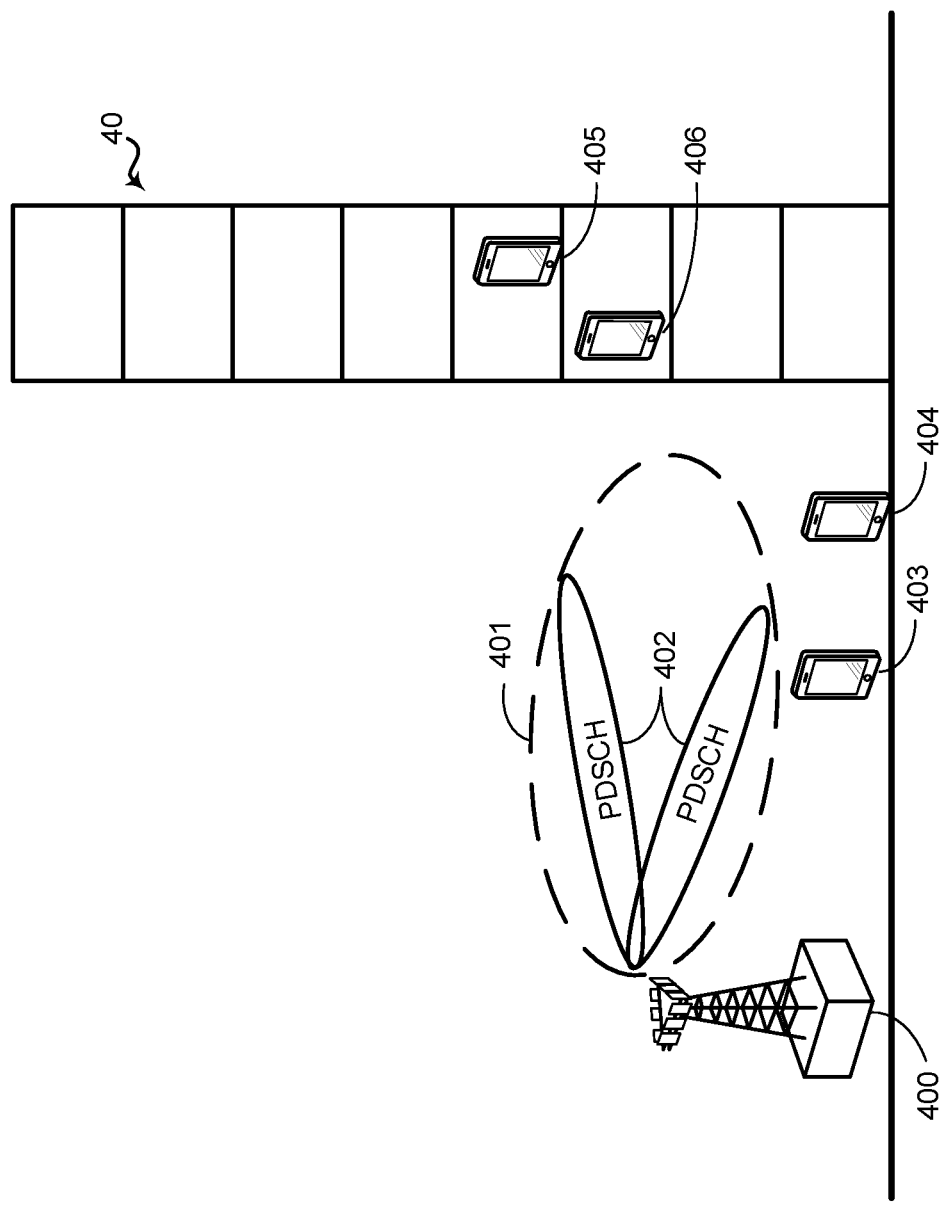
FIG. 4A is a block diagram illustrating an example base station transmitting non-precoded CSI-RS.

For CSI reporting in systems having FD-MIMO, a CSI process may be configured with either of two CSI reporting classes, class A non-precoded or class B beamformed. FIG. 4A is a block diagram illustrating an example base station 400 transmitting non-precoded CSI-RS 401. In class A non-precoded reporting, one non-zero power (NZP) CSI-RS resource per CSI process may be used for channel measurement in which the number of CSI-RS ports may be 8, 12, or 16. Interference measurement in class A reporting may include one CSI-interference measurement (IM) resource per CSI process. This category comprises schemes where different CSI-RS ports have the same wide beam width and direction and, hence, generally cell wide coverage.

Base station 400 serves UEs 403 and 404 and UEs 405 and 406 in structure 40. 2D CSI-RS ports transmit non-precoded CSI-RS 401 and PDSCH 402 to UEs 403-406. In reporting CSI feedback, UEs 403-406 measure the non-precoded CSI-RS and reports CQI, precoding matrix indicator (PMI) (2D codebook), and rank indicator to base station 400.

Figure 4B:
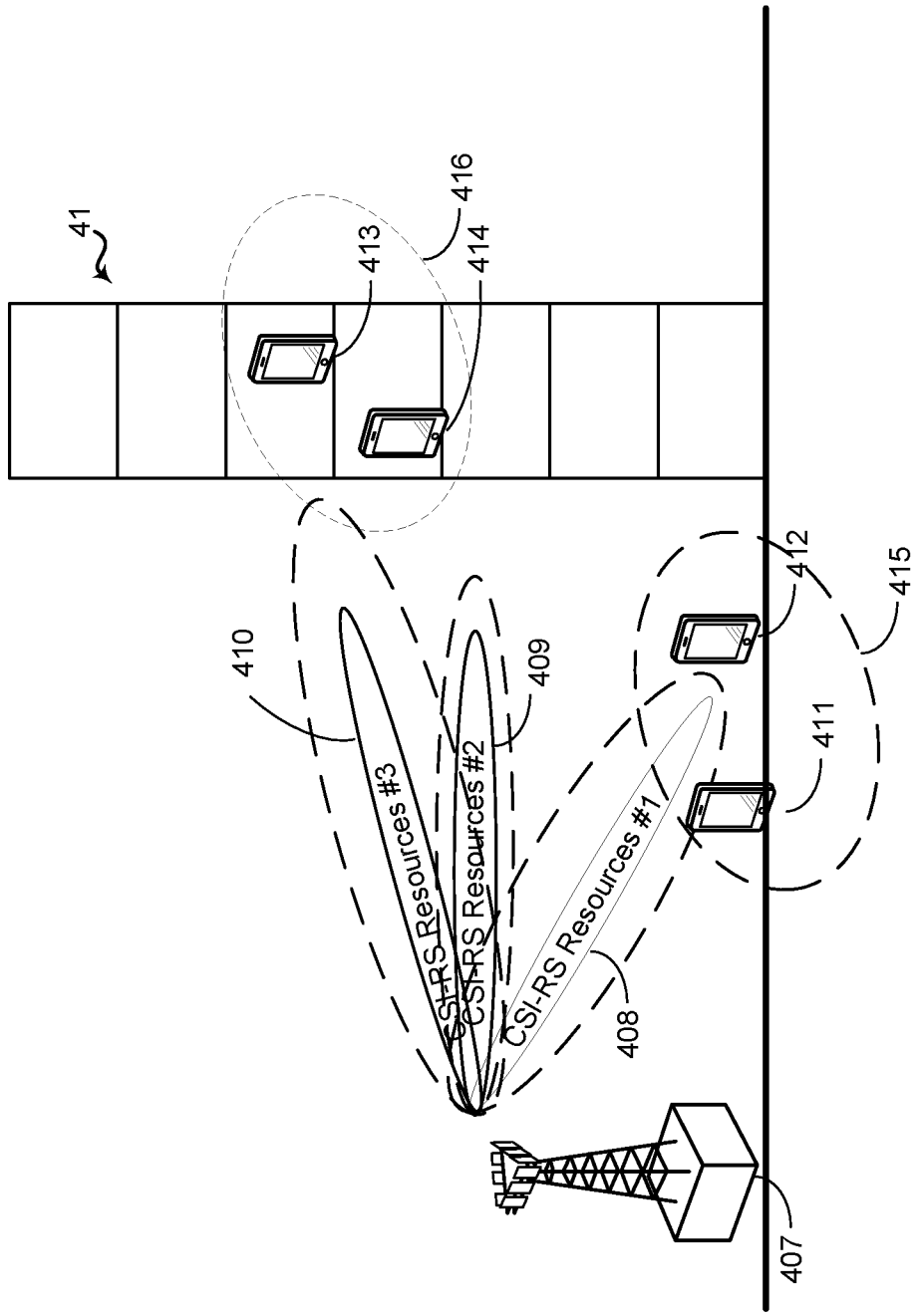
FIG. 4B is a block diagram illustrating an example base station transmitting beamformed CSI-RS using CSI-RS resources.

FIG. 4B is a block diagram illustrating an example base station 407 transmitting beamformed CSI-RS using CSI-RS resources 408-410. CSI-RS resources 408-410 may be directed to serve different UE groups, such as UE group 415, including UEs 411 and 412, and UE group 416, including UEs 413 and 414 in structure 41. Because different CSI-RS resources are used for different UE groups, when providing CSI feedback, UEs 411-414 report CQI, PMI (1D codebook), rank indicator, as well as the CSI-RS resource indicator (CRI), if K>1, which identifies to base station 407 which of the CSI-RS resources the UE has measured and provided channel state information (CSI) feedback for.

In class B beamformed CSI reporting, each CSI process may be associated with K NZP CSI-RS resources/configurations, with $N_k$ ports for the $k^{th}$ CSI-RS resource (K could be ≥1), in which $N_k$ may be 1, 2, 4, or 8, and may be different for each CSI-RS resource. Each CSI-RS resource may also have different CSI-RS port virtualization, e.g., virtualized from different sets of antenna elements or from the same set of antenna elements but with different beamforming weights. Multiple CSI-IM per CSI process is also possible, with one-to-one linkage to each NZP CSI-RS resource. This category generally comprises schemes where, at least at a given time/frequency, the CSI-RS ports have narrow beam widths and, hence, do not have cell wide coverage, and at least some of the CSI-RS port-resource combinations may have different beam directions.

Figure 5:
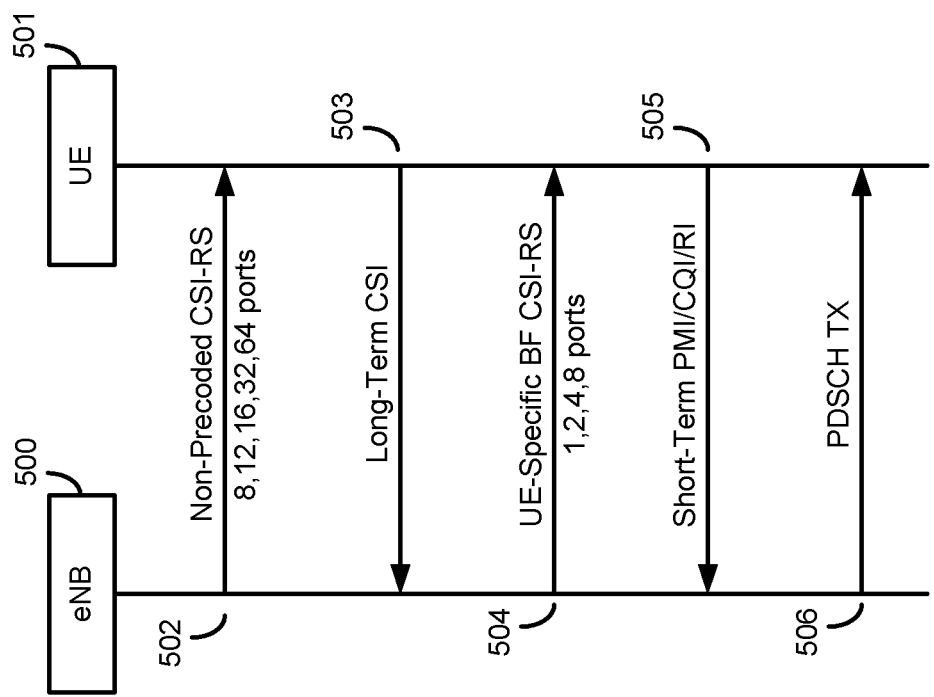
FIG. 5 is a block diagram illustrating an eNB and a UE configured for a hybrid CSI-RS feedback operation.

FIG. 5 is a block diagram illustrating eNB 500 and UE 501 configured for a hybrid CSI-RS feedback operation. At 502, eNB 500 transmits non-precoded CSI-RS. Depending on the configuration of the CSI-RS resources, eNB 500 may transmit the non-precoded CSI-RS using 8, 12, 16, 32, or 64 antenna ports. With hybrid CSI-RS based FD-MIMO, CSI reporting is performed in two stages. At the first stage, UE 501 measures the non-precoded CSI-RS and, at 503, transmits long term CSI feedback to eNB 500. At 504, eNB 500 transmits the beamformed CSI-RS. In the second stage, UE 501 measures the beamformed CSI-RS configured by eNB 500 and, at 505, transmits the short term CSI feedback report. In some aspects, the serving cell, such as eNB 500 may determine or configure the beamformed CSI-RS based on the first-stage long term CSI feedback from UE 501. In fact, eNB 500 may select the number of ports for the resource configuration of the beamformed CSI-RS based on the first stage CSI feedback. eNB 500 transmits non-precoded CSI-RS at a lower rate but with a larger number of CSI-RS ports than is used for transmitting the beamformed CSI-RS. Thus, the CSI reporting associated with non-precoded CSI-RS may be configured at a lower feedback rate than CSI reporting associated with beamformed CSI-RS. Using the various reported CSI feedback for short term and long term conditions, eNB 500 will then transmit downlink data to UE 501 via PDSCH at 506.

Hybrid CSI-RS based FD-MIMO is another promising technique with the benefit to reduce CSI-RS overhead and improve FD-MIMO performance. Hybrid CSI-RS based FD-MIMO can be leveraged using multiple CSI processes. For example, a first CSI process may be configured with class A non-precoded CSI-RS for the first stage of long-term CSI feedback and a second CSI process may be configured with class B beamformed CSI-RS, with K=1, for the second stage of short-term CSI report. However, there may be a few issues with this approach. Collision may occur between CSI reports based on measurements of non-precoded and beamformed CSI-RS. In such collision instances, the CSI reporting for the non-precoded CSI will be dropped when the CSI process associated with the non-precoded CSI-RS is not configured with a lower CSI process identifier (ID). This may cause unnecessary performance loss, as the CSI reporting for non-precoded CSI-RS is fed back much less frequently. Therefore, when such CSI reporting for non-precoded CSI-RS is dropped, stale CSI reports may be used for forming the beamformed CSI-RS at the second stage CSI feedback.

In additional to the potential for stale non-precoded CSI reports, current hybrid CSI-RS operations may also include unnecessary subband precoding matrix indicator (W2), and channel quality indicator (CQI) reporting for non-precoded CSI-RS. For CSI processes with non-precoded CSI-RS, a UE may report RI, PMI, and CQI, among which the PMI may also include a wideband precoding matrix, W1, and one or more subband precoding matrices, W2. The report of the more short term indicative W2 and CQI based on a non-precoded CSI-RS would not be required and could be avoided in order to reduce uplink feedback overhead and UE complexity.

Additionally, the current CSI-RS port to RE mapping for beamformed CSI-RS resource does not efficiently support CSI-RS resource sharing among UEs configured with the same or different numbers of CSI-RS ports. The beamformed CSI-RS resources may generally only be shared in a TDM operation among UEs, as partial resource multiplexing via FDM is not supported. Dynamic reconfiguration of the beamformed CSI-RS resource based on the first stage long-term CSI feedback may be used for such purpose but would increase unnecessary signaling overhead.

Figures 6A, 6B:
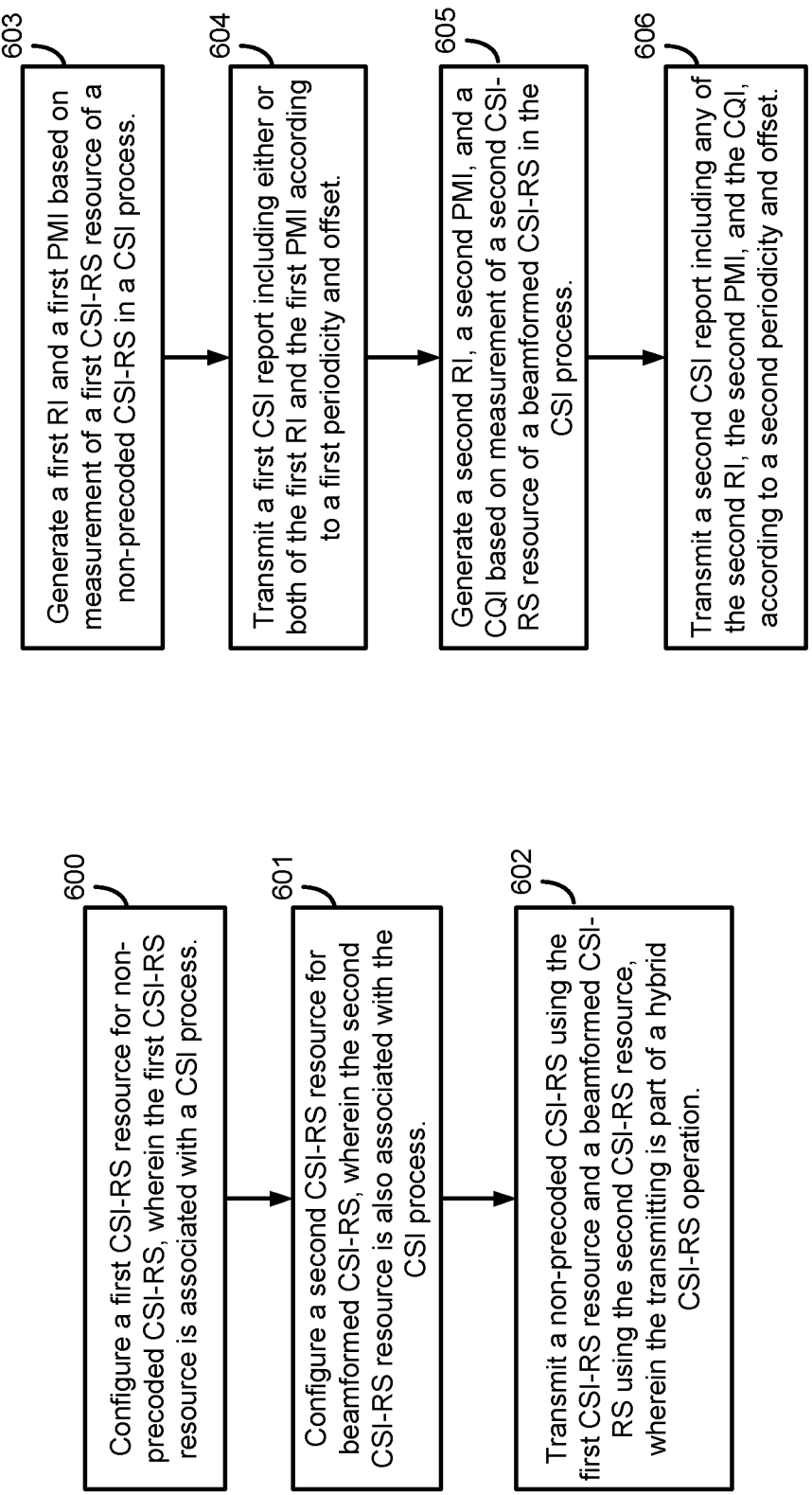
FIG. 6A is a block diagram illustrating example blocks executed to implement one aspect of the present disclosure.
FIG. 6B is a block diagram illustrating example blocks executed to implement one aspect of the present disclosure.
Figure 14:
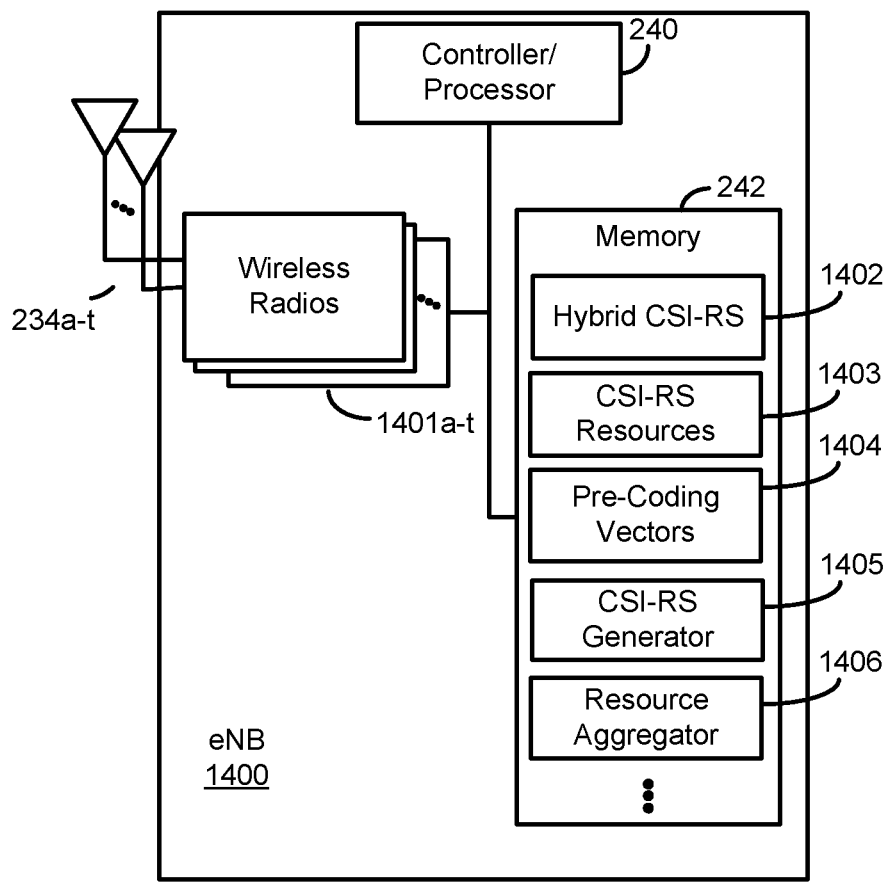
FIG. 14 is a block diagram illustrating an eNB configured according to aspects of the present disclosure.

FIG. 6A is a block diagram illustrating example blocks executed to implement one aspect of the present disclosure. The example blocks and actions described with respect to FIG. 6A will also be described with respect to the structure, hardware, and components of eNB 1400, as illustrated in FIG. 14. FIG. 14 is a block diagram illustrating an eNB 1400 configured according to aspects of the present disclosure. eNB 1400 include the structure, hardware, and components as illustrated for eNB 105 of FIG. 2. For example, eNB 1400 includes controller/processor 240, which operates to execute logic or computer instructions stored in memory 242, as well as controlling the components of eNB 1400 that provide the features and functionality of eNB 1400.

At block 600, a base station may configure a first CSI-RS resource for non-precoded CSI-RS, wherein the first CSI-RS resource is associated with a particular CSI process. For example, eNB 1400 includes functionality to perform hybrid CSI-RS operations. Under control of controller/processor 240, eNB 1400 executes hybrid CSI-RS logic 1402 stored in memory 242. Execution of hybrid CSI-RS logic 1402 creates a functioning environment in which eNB 1400 may configure the hybrid CSI-RS operation. Thus, execution of hybrid CSI-RS logic 1402 accesses CSI-RS resources 1403, in memory 242, to select the first CSI-RS resources for the non-precoded CSI-RS. In one example implementation, the first CSI-RS resource may be configured with a full set of ports ($2 \times N_1 \times N_2$ ports) for full CSI-RS or a partial set of ports ($2 \times N_1 + N_2$ ports) for partial CSI-RS of non-precoded CSI-RS. Where $N_1$ and $N_2$ are the number of antenna ports on the $1^{st}$ and $2^{nd}$ dimension of the antenna array, respectively.

It should be noted that in various aspects associated with the example illustrated in FIG. 6A, the class A CSI-RS codebook for long-term W1 feedback may be reused.

At block 601, the base station may also configure a second CSI-RS resource for beamformed CSI-RS, wherein the second CSI-RS resource is also associated with the same CSI process. For example, eNB 1400, in execution of hybrid CSI-RS logic 1402, eNB 1400 may access CSI-RS resources 1403 to select the CSI-RS resources for the beamformed CSI-RS. As a part of configuring the CSI-RS resources for the beamformed CSI-RS, eNB 1400 may selected the specific set of pre-coding vectors from pre-coding vectors 1404, stored in memory 242. The enhanced hybrid CSI-RS operation according to the described aspect, as provided in the functionality of executing hybrid CSI-RS logic 1402 configures at least two CSI-RS resources with the same CSI process for CSI reporting. In one example implementation, the second CSI-RS resource may be configured with $N_p$-ports beamformed CSI-RS. It should be noted that, in various implementations of the described aspect, $N_p$ may be semi-statically configured and independent of the first stage long-term CSI feedback.

It should further be noted that in various aspects associated with the example illustrated in FIG. 6A, the class B (K=1) CSI-RS codebook for short-term W2 feedback may be reused with only W2 feedback transmitted.

It should further be noted that, in various aspects of the present disclosure, the first and second CSI-RS resources may be configured independently. For example, the first and second CSI-RS resources may be configured based on a frequency resource mapping for available frequencies, based on time resource mapping for available symbols, and based on one or more of a periodicity and subframe offset.

At block 602, the base station transmits a non-precoded CSI-RS using the first CSI-RS resource and a beamformed CSI-RS using the second CSI-RS resource as a part of a hybrid CSI-RS operation. For example, eNB 1400, under control of controller/processor 240, generates the non-precoded CSI-RS for the first stage of the hybrid CSI through CSI-RS generator 1405, stored in memory 242, and transmits the non-precoded CSI-RS via wireless radios 1401*a-t* and antennas 234*a-t*. Wireless radios 1401*a-t* may include the various hardware and components illustrated in FIG. 2 with regard to eNB 105, such as modulator/demodulators 232*a-t*, TX MIMO processor 230, transmit processor 220, MIMO detector 236, and receive processor 238. Thus, after transmitting the non-precoded CSI-RS, eNB 1400 would receive a first CSI report from a UE based on measurements of the non-precoded CSI-RS. Depending on the particular aspect of the present disclosure, the base station, such as eNB 1400, may or may not use the first CSI report information to configure the beamformed CSI-RS. If based on the first CSI report information, eNB 1400 would use the first CSI report to select the set of pre-coding vectors from pre-coding vectors 1404. After transmitting the beamformed CSI-RS, eNB 1400 will then receive a second CSI report from the UE based on measurement of the beamformed CSI-RS. The base station may then utilize the first and second CSI reports and the information contained therein to manage further data transmissions to the UE.

Figure 15:
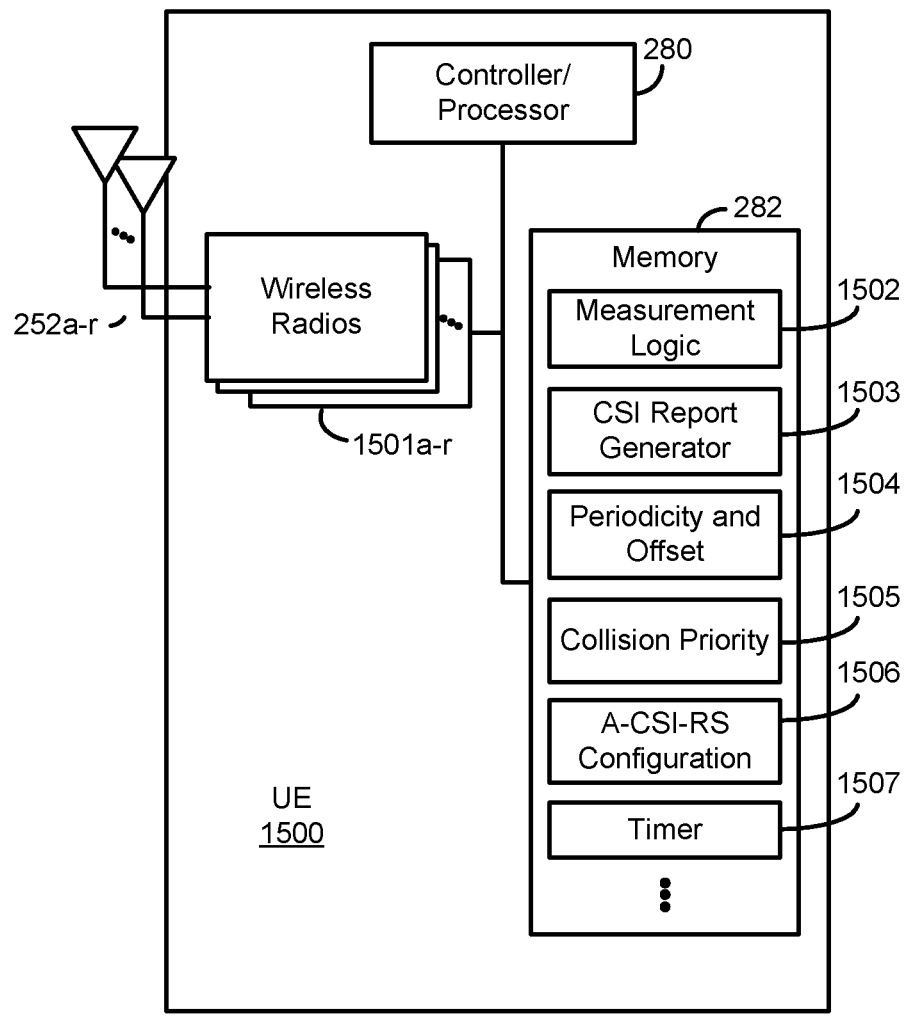
FIG. 15 is a block diagram illustrating a UE configured according to aspects of the present disclosure.

FIG. 6B is a block diagram illustrating example blocks executed to implement one aspect of the present disclosure. The example blocks and actions described with respect to FIG. 6B will also be described with respect to the structure, hardware, and components of UE 1500, as illustrated in FIG. 15. FIG. 15 is a block diagram illustrating a UE 1500 configured according to aspects of the present disclosure. UE 1500 includes the structure, hardware, and components as illustrated for UE 115 of FIG. 2. For example, UE 1500 includes controller/processor 280, which operates to execute logic or computer instructions stored in memory 282, as well as controlling the components of UE 1500 that provide the features and functionality of UE 1500.

At block 603, a UE generates a first RI and a first PMI based on measurement of the non-precoded CSI-RS within a first CSI-RS resource of a CSI process. For example, a UE, such as UE 1500, measures the non-precoded CSI-RS of the first CSI-RS resource associated with the CSI process using measurement logic 1502, stored in memory 282, executed by controller/processor 280. The execution of measurement logic 1502 by controller/processor 280 creates a functional environment within UE 1500 that analyzes the various parameters of received signals received through antennas 252*a-r* and wireless radios 1501*a-r*. This measurement of the non-precoded CSI-RS allows UE 1500 to generate the first RI and PMI via execution by controller/processor 280 of CSI report generator 1502, stored in memory 282.

At block 604, the UE transmits, according to a first periodicity and offset, a first CSI report that includes either or both of the first RI and first PMI. For example, UE 1500 may transmit the generated first RI and PMI via wireless radios 1501*a-r* and antennas 252*a-r*. Wireless radios 1501*a-r* may include the hardware and components illustrated in FIG. 2 for UE 115, including demodulator/modulators 254*a-r*, TX MIMO processor 266, transmit processor 264, receive processor 258, and MIMO detector 256. In some aspects, the first RI and the first PMI will jointly determine the set of precoding vectors for the base station to configure the beamformed CSI-RS associated with the second CSI-RS resource.

At block 605, the UE generates a second RI, a second PMI, and a CQI based on measurement of a beamformed CSI-RS within a second CSI-RS resource associated with the same CSI process. For example, UE 1500 executes, under control of controller/processor 280 measurement logic 1502 and CSI report generator 1503 to obtain parameter measurements of the beamformed CSI-RS and generate the resulting second RI, second PMI, and CQI.

At block 606, the UE transmits a second CSI report including any or all of the second RI, second PMI, and the CQI according to a second periodicity and offset. For example, UE 1500 may transmit the generated second RI and PMI and the CQI via wireless radios 1501a-r and antennas 252a-r. In some aspects, UE 1500 may transmit the second RI and the CQI and not transmit the second PMI when UE 1500 is configured with semi-open-loop CSI reporting. In such aspects, the second RI and CQI may be determined using the precoder cycling within the codebook set associated with the second CSI-RS resource. UE 1500 will transmit the first CSI reports including any of first RI and PMI and the second CSI reports including any of the second RI, second PMI, and CQI at times controlled by periodicity and offset 1504, stored in memory 282. Controller/processor 280 accesses the first and second periodicities and offsets at periodicity and offset 1504 for its CSI report transmissions. In various aspects of the present disclosure, the first and second periodicities and subframe offsets for CSI reporting associated with non-precoded and beamformed CSI-RS, respectively, may be independently configured. Alternatively, a periodicity factor may be configured by higher layer signaling for CSI reporting for non-precoded CSI-RS corresponding to same subframe offset for CSI reporting for both non-precoded and beamformed CSI-RS.

In a first example implementation of periodic CSI reporting, such as for PUCCH Mode 1-1, for first or second RI reporting:

$$\left(10 \times n_f + \left\lfloor \frac{n_s}{2} \right\rfloor - N_{OFFSET,CQI(j)} - N_{OFFSET,RI(j)}\right) \mod(M_{RI(j)} \cdot N_{pd(j)}) = 0$$

Where $M_{RI(j)}$ represents the RI periodicity, $N_{OFFSET,RI(j)}$ represents the subframe offset for RI, $N_{OFFSET,CQI(j)}$ represents the subframe offset for CQI, and $N_{pd(j)}$ represents the CQI periodicity. Each of $M_{RI(j)}$, $N_{OFFSET,RI(j)}$, $N_{OFFSET,CQI(j)}$, and $N_{pd(j)}$ may be configured by higher layer signaling received at the UE from a serving base station. The aspect j=0 is used for the first RI reporting associated with the first CSI-RS resource, and the aspect j=1 is used for second RI reporting associated with the second CSI-RS resource. For first PMI reporting associated with the first CSI-RS resource:

$$\left(10 \times n_f + \left\lfloor \frac{n_s}{2} \right\rfloor - N_{OFFSET,CQI(j=0)}\right) \mod(H' \cdot N_{pd(j=0)}) = 0$$

Where H' is a higher layer configuration parameter reused from the current RRC specification to represent a periodicity factor for first PMI reporting, $n_f$ and $n_s$ are the radio frame and slot index. For the second PMI and CQI reporting associated with the second CSI-RS resource:

$$\left(10 \times n_f + \left\lfloor \frac{n_s}{2} \right\rfloor - N_{OFFSET,CQI(j=1)}\right) \mod(N_{pd(j=1)}) = 0$$

In a second example implementation for periodic CSI reporting, such as for PUCCH Mode 1-1, for first or second RI reporting:

$$\left(10 \times n_f + \left\lfloor \frac{n_s}{2} \right\rfloor - N_{OFFSET,CQI} - N_{OFFSET,RI}\right) \mod(M_{RI} \cdot N_{pd} \cdot M_{p(j)}) = 0$$

Where, $M_{RI}$, $N_{OFFSET,RI}$, $N_{OFFSET,CQI}$ and $N_{pd}$ are RI and CQI reporting periodicity and subframe offset based on higher layer signaling received at the UE from a serving base station. $M_{p(j=0)} \geq 1$ represents a periodic factor configured for the first RI reporting associated with the first CSI-RS resource and $M_{p(j=1)}$ may be fixed to 1 for the second RI reporting associated with the second CSI-RS resource. For first PMI reporting associated with the first CSI-RS resource:

$$\left(10 \times n_f + \left\lfloor \frac{n_s}{2} \right\rfloor - N_{OFFSET,CQI}\right) \mod(H' \cdot N_{pd} \cdot M_{p(j=0)}) = 0$$

Where H' is, again, an integer reused from the current RRC specifications. For second PMI and CQI reporting associated with the second CSI-RS resource:

$$\left(10 \times n_f + \left\lfloor \frac{n_s}{2} \right\rfloor - N_{OFFSET,CQI}\right) \mod(N_{pd}) = 0$$

Figure 7:
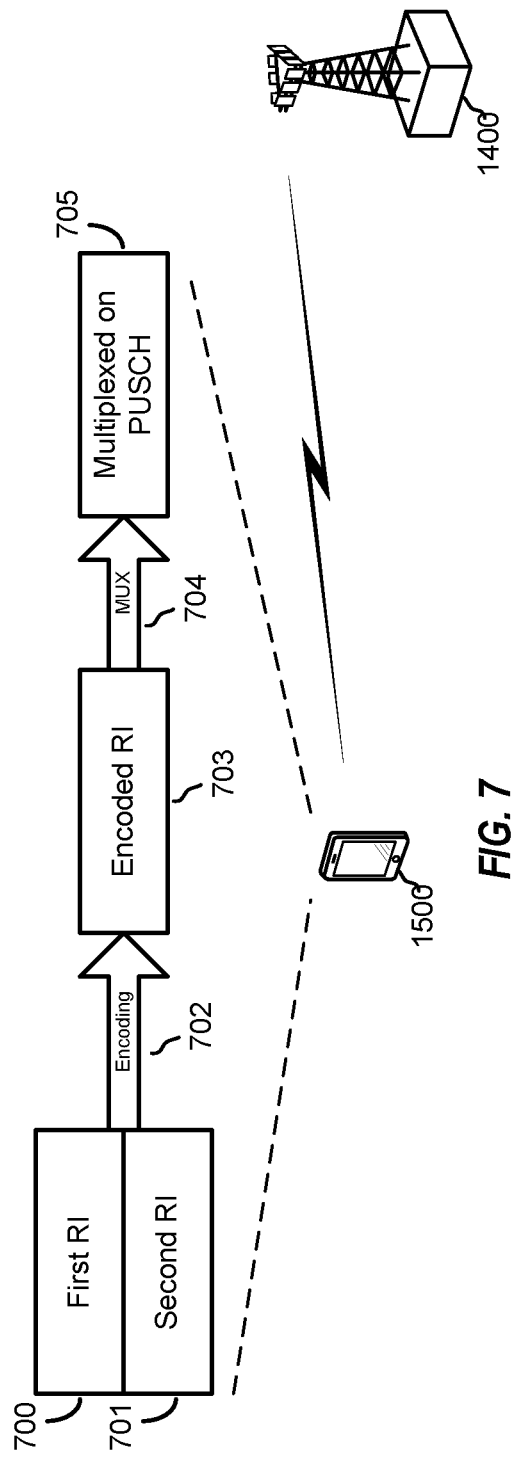
FIGS. 7 and 8 are block diagrams illustrating an eNB and a UE configured for hybrid CSI-RS operations according to aspects of the present disclosure.
Figure 8:
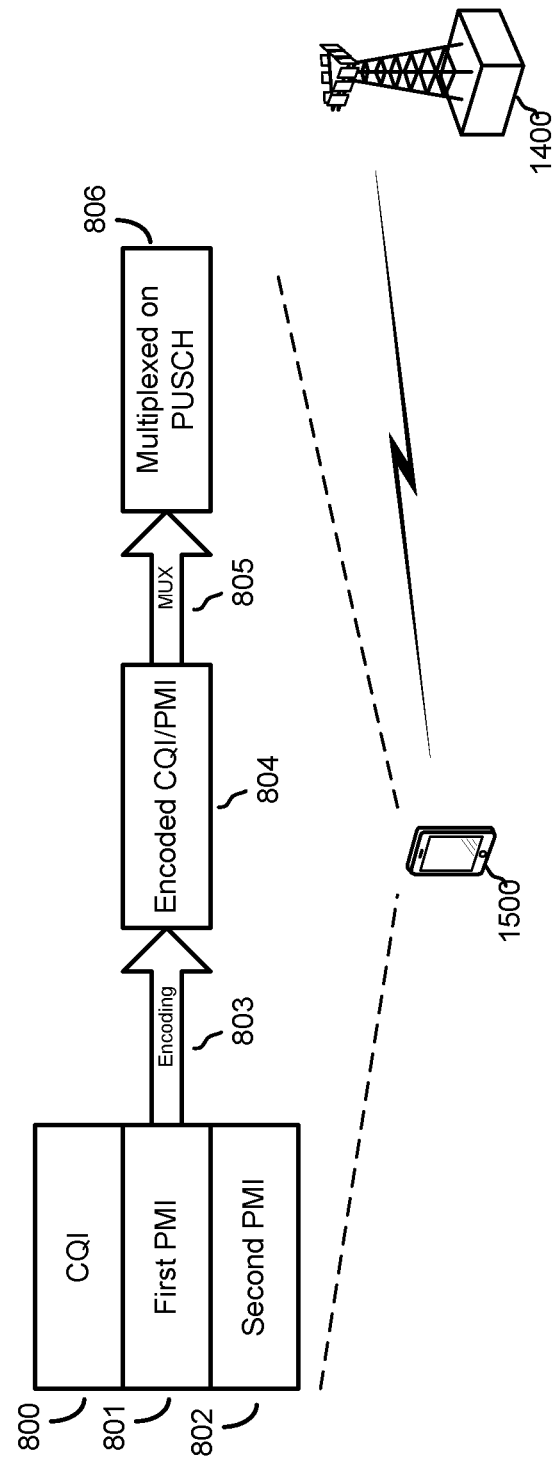

FIGS. 7 and 8 are block diagrams illustrating eNB 1400 and UE 1500 configured for hybrid CSI-RS operations according to aspects of the present disclosure. When triggered for aperiodic CSI reporting using hybrid CSI-RS operations of various aspects of the present disclosure, a UE, such as UE 1500, through execution by controller/processor 280 of CSI report generator 1503, stored in memory 282, may jointly code both first and second CSI reports. UE 1500 will access A-CSI configuration 1506, in memory 282, to configure the particular information and transmission parameters for aperiodic CSI reporting. For example, first RI 700, based on measurements of the non-precoded CSI-RS transmitted from eNB 1400 and second RI 701 based on measurements of the beamformed CSI-RS transmitted from eNB 1400 are encoded at 702 into encoded RI 703. First RI 700 may be mapped first for joint coding purposes. Encoded RI 703 may then be multiplexed at 704 into PUSCH 705 for transmission to eNB 1400.

Similarly, UE 1500, through execution by controller/processor 280 of measurement logic 1502 and CSI report generator 1503, generates first PMI 801 from measurements of the non-precoded CSI-RS and CQI 800 and second PMI 802 from measurements of the beamformed CSI-RS. UE 1500 maps the aperiodic CSI report for FIG. 8 according to the order CQI 800, first PMI 801, and then second PMI 802. CQI 800, first PMI 801, and second PMI 802 are then encoded at 803 into encoded CQI/PMI 804. Encoded CQI/PMI 804 may then be multiplexed at 805 into PUSCH 806 for transmission to eNB 1200.

Figure 9:
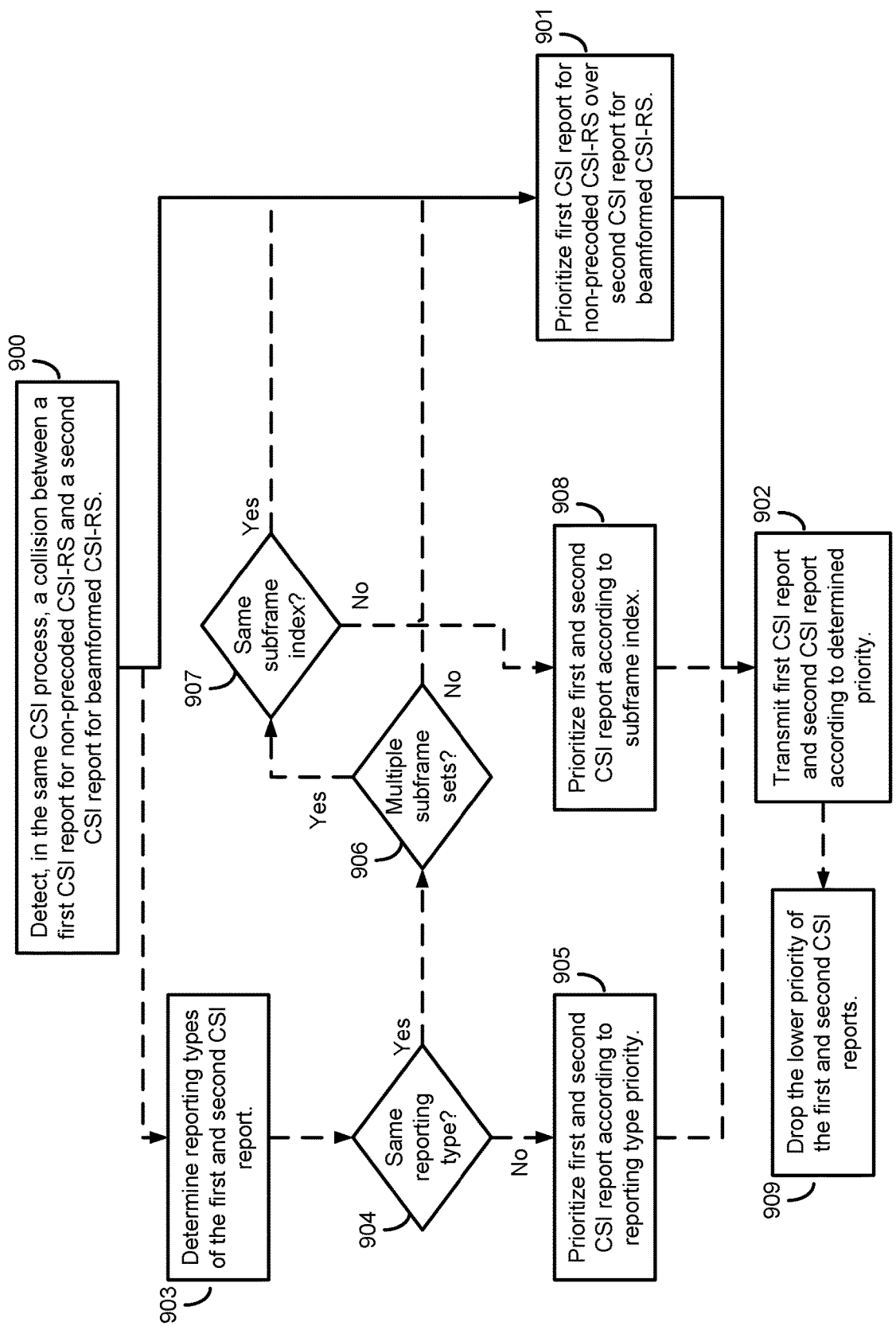
FIG. 9 is a block diagram illustrating example blocks executed to implement aspects of the present disclosure.

FIG. 9 is a block diagram illustrating example blocks executed to implement aspects of the present disclosure. At block 900, a UE detects, in the same CSI process, a collision between a first CSI report for non-precoded CSI-RS and a second CSI report for beamformed CSI-RS. Various aspects of the present disclosure may provide for different priority options in order to resolve such collisions for periodic CSI reporting. These different priority options may be stored by a UE, such as UE 1500, at collision priority 1505 in memory 282.

In one example option, at block 901, the UE, such as UE 1500, prioritizes the first CSI report for non-precoded CSI-RS over the second CSI report for beamformed CSI-RS. Because aspects of the present disclosure may use the first CSI report to determine the set of precoding vectors for forming the beams of the beamformed CSI-RS, giving priority to the CSI reports for the non-precoded CSI-RS helps to avoid stale CSI information. According to the current standards, PUCCH reporting types include a prioritization schedule among the different types (e.g., Type 3

RI>Type 2a first PMI>Type 2 CQI/PMI, etc.). However, in the first example option illustrated and described with respect to FIG. 9, the CSI report associated with the non-precoded CSI-RS will have a higher priority than the CSI report associated with the beamformed CSI-RS, regardless of reporting types (e.g., Type 3 RI for non-precoded CSI-RS>Type 2a 1$^{st}$ PMI for non-precoded CSI-RS>Type 3 RI for beamformed CSI-RS>Type 2 CQI/PMI for beamformed CSI-RS, where "A>B" represents a priority of A over B).

At block 902, the UE then transmits the first CSI report and the second CSI report according to the determined priority for periodic CSI reporting. For example, UE 1500 would transmit the first and second CSI reports according to the priority found in collision priority 1505. The reports are transmitted via wireless radios 1501a-r and antennas 252a-r.

In a second example option, after detecting the collision at block 900, the UE, at block 903, determines the reporting type of the first and second CSI reports. For example, determining whether the first and second CSI reports are Type 3, Type 2a, Type 2, and the like.

At block 904, a determination is made whether the first and second CSI reports have the same reporting type. If not, then, at block 905, the first and second CSI reports are prioritized according to the reporting type priority before being transmitted, at block 902. Thus, the CSI report associated with non-precoded CSI-RS has higher priority than the CSI report associated with beamformed CSI-RS when CSI report with PUCCH reporting type have the same priority. For example, the priorities may be defined as the following, Type 3 RI for non-precoded CSI-RS>Type 3 RI for beamformed CSI-RS>Type 2a 1$^{st}$ PMI for non-precoded CSI-RS>Type 2 CQI/PMI for beamformed CSI-RS.

Otherwise, if the reporting types of the first and second CSI reports are the same, then, at block 906, a determination is made whether the CSI process has been configured for multiple subframe sets. If so, then, at block 907, another determination is made whether the subframe set index is the same. If the subframe set index is not the same, then, at block 908, the UE will prioritize the first and second CSI reports according to subframe set index before transmitting the first and second CSI reports, at block 902.

If, according to the determinations at block 906 and 907, either the CSI process is not configured to have multiple subframe sets or the subframe set indices are the same, then, at block 901, the UE prioritizes the first CSI report for non-precoded CSI-RS over the second CSI report for beamformed CSI-RS before transmitting at block 902.

It should be noted that in additional aspects, when two or more subframe sets are configured in the CSI process, the priority can be further defined as either: PUCCH reporting type>non-precoded/beamformed CSI-RS resource>subframe set index; or PUCCH reporting type>subframe set index>non-precoded/beamformed CSI-RS resource.

In further handling collisions between the first CSI report for non-precoded CSI-RS and the second CSI report for beamformed CSI-RS, the UE, such as UE 1500, at block 909, drops the lower priority of the first and second CSI reports from the transmission queue. Thus, after determining the colliding report that has a higher priority based on the priority contained in collision priority 1505, UE 1500 would drop the lower-priority CSI reports. The UE may drop either of the first or second CSI report according to various options depending on the example aspect implemented. In a first example implementation, in which a first RI reporting instance associated with non-precoded CSI-RS resource collides with second RI reporting instance associated with beamformed CSI-RS resource, the UE may drop the second RI. In a second example implementation, in which a first RI reporting instance associated with non-precoded CSI-RS resource collides with second PMI/CQI reporting instance associated with beamformed CSI-RS resource, the UE may drop the second PMI/CQI. In a third example implementation, in which a first PMI reporting instance associated with non-precoded CSI-RS resource collides with second RI reporting instance associated with beamformed CSI-RS resource, a first option may be for the UE to drop the second RI, while a second option may be for the UE to drop the first PMI. In a fourth example implementation, in which a first PMI reporting instance associated with non-precoded CSI-RS resource collides with second PMI/CQI reporting instance associated with beamformed CSI-RS resource, the UE may drop the second PMI/CQI.

It should be noted that in the various aspects of the present disclosure many different options may exist for determining which of multiple colliding CSI reports to drop or for determining priority of colliding CSI reports for periodic CSI reporting.

FIGS. 10A-10D are block diagrams illustrating eNB 1400 and UE 1500 configured according to aspects of the present disclosure. For purposes of aperiodic CSI reporting for hybrid CSI-RS operations, various alternatives may be used for the hybrid CSI-RS operations according to the present disclosure. In one example implementation illustrated in FIG. 10A, at 1000, eNB 1400 transmits an aperiodic CSI trigger via wireless radios 1401a-t and antennas 234a-t. At 1001 eNB 1400 generates and transmits a non-precoded CSI-RS and at 1002 transmits a beamformed CSI-RS by executing CSI-RS generator and, sending, under control of controller/processor 240, the non-precoded and beamformed CSI-RS via wireless radios 1401a-t and antennas 234a-t. In this first alternative implementation of FIG. 10A, CSI for non-precoded CSI-RS and beamformed CSI-RS are reported jointly in the same subframe when A-CSI is triggered. Thus, when triggered by the aperiodic CSI trigger at 1000, UE 1500 will execute CSI report generator 1503 which after generating the CSI reports will trigger joint transmission of the CSI reports for both the non-precoded and beamformed CSI-RS in the subframe at 1003 via wireless radios 1501a-r and antennas 252a-r.

Figure 10B:
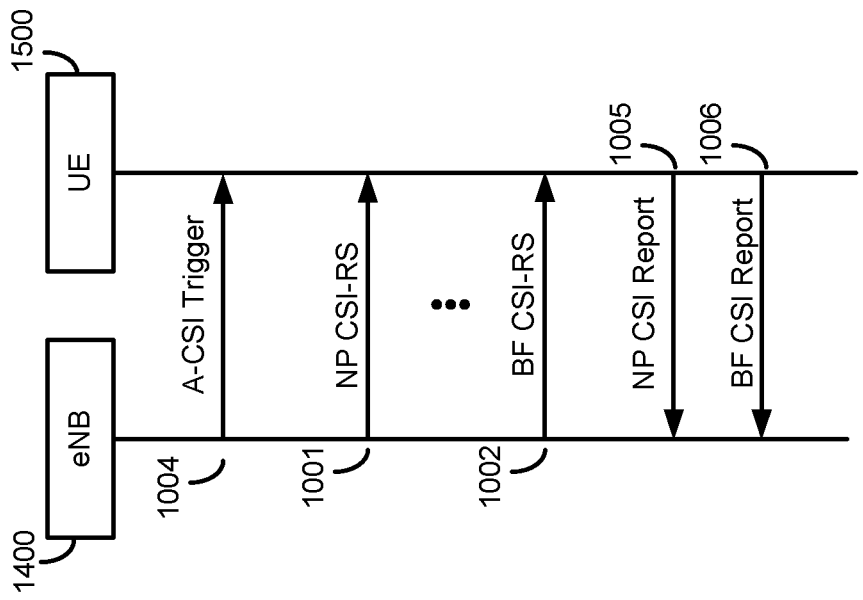
FIGS. 10A-10D are block diagrams illustrating an eNB and a UE configured according to aspects of the present disclosure.
Figure 10A:
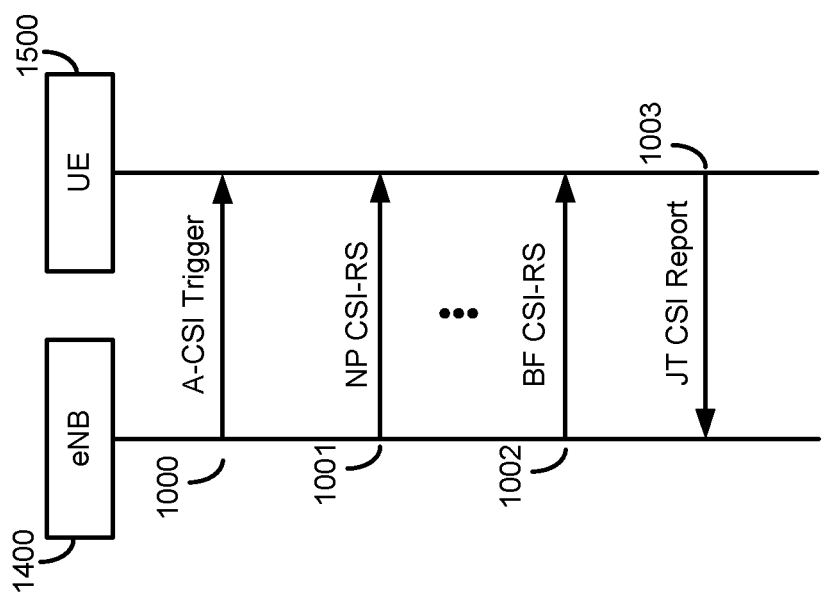

In a second alternative implementation illustrated in FIG. 10B, eNB 1400 transmits an aperiodic CSI trigger at 1004. However, in this aperiodic trigger, CSI for the non-precoded and beamformed CSI-RS may be triggered separately, for separate reporting. Thus, after eNB 1400 transmits the non-precoded CSI-RS and beamformed CSI-RS at 1001 and 1002, respectively, based on the separate reporting scheduled by the aperiodic CSI trigger at 1004, UE 1500 transmits the CSI report for the non-precoded CSI-RS at 1005 and the CSI report for the beamformed CSI-RS at 1006. In this second alternative implementation, CSI is reported according to the CSI triggering signaling, which allows separate report of CSI for non-precoded and beamformed CSI-RS. In such aspect, one or more bits may be added to the downlink control information (DCI) signal in order to trigger UE 1500 whether to generate and send either or both of the CSI for the non-precoded CSI-RS or CSI for beamformed CSI-RS.

Figure 10D:
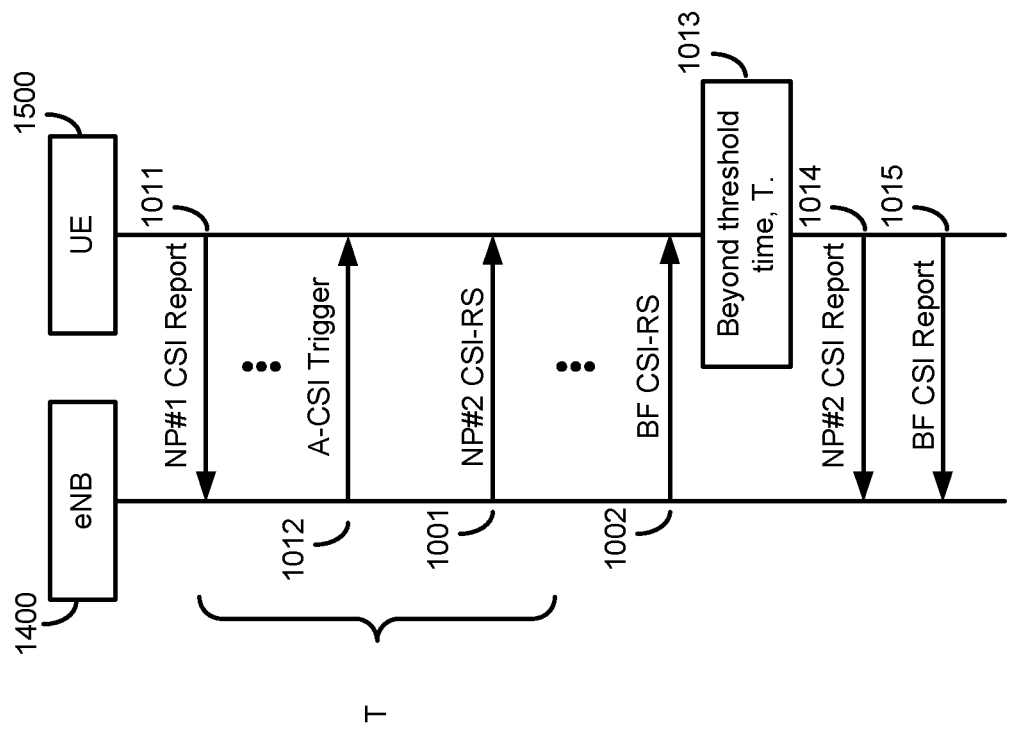
Figure 10C:
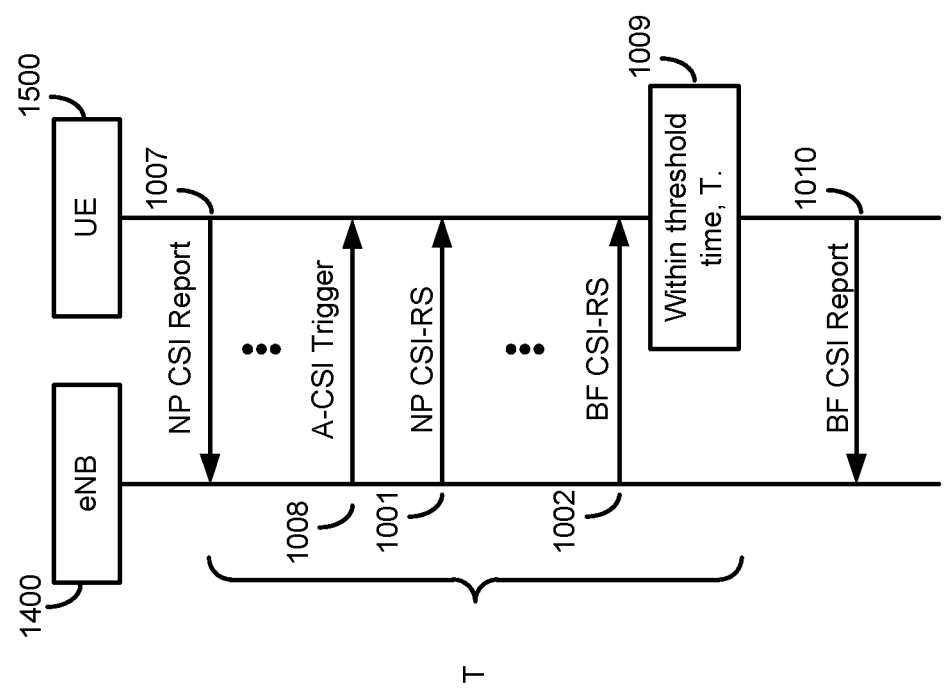

In a third alternative implementation illustrated in FIG. 10C, the CSI reporting for the non-precoded CSI-RS may be reported according to a timer or threshold time, T. At 1007, UE 1500 reports a CSI associated with a previous non-precoded CSI report (not shown). At 1008, eNB 1400 transmits an aperiodic CSI trigger for UE 1500. eNB 1400 then transmits the non-precoded CSI-RS and beamformed CSI-RS at 1001 and 1002, respectively. After transmitting the CSI report for the non-precoded CSI-RS at 1007, UE 1500 begins a timer. Before transmitting an updated CSI report for non-precoded CSI-RS, UE 1500 first checks the timer to determine whether a threshold time, T, has passed since the previous CSI report transmissions. As illustrated in FIG. 10C, UE 1500 determines that the previous CSI report for non-precoded CSI-RS, transmitted at 1007, was transmitted within the threshold time, T, from the next scheduled transmission subframe identified in the aperiodic CSI trigger at 1008. Because the last transmission was within threshold time, T, UE 1500 does not transmit an updated CSI report for the non-precoded CSI-RS transmitted at 1001. The next CSI transmission for UE 1500 will be the CSI report at 1010 for the beamformed CSI-RS transmitted at 1002. For this third alternative aspect, for an aperiodic CSI report in uplink subframe n, if CSI for non-precoded CSI-RS has been reported on or after subframe n-T where T is the threshold time fixed or configured by higher layer signaling, then only the CSI associated with beamformed CSI-RS is reported, otherwise the CSI for both non-precoded and beamformed CSI-RS are jointly reported.

In a fourth alternative implementation illustrated in FIG. 10D, UE 1500 can report but is not required to update the CSI associated with non-precoded CSI-RS when CSI for non-precoded CSI-RS has been reported on or after subframe n-T. At 1011, UE 1500 transmits non-precoded #1 CSI report based on a previously received non-precoded #1 CSI-RS (not shown). Upon transmission of the non-precoded #1 CSI report, UE 1500 begins a timer. At 1012, eNB 1400 sends an aperiodic CSI trigger to UE 1500 and then transmits non-precoded #2 CSI-RS and beamformed CSI-RS at 1001 and 1002, respectively. Based on the scheduled subframe from the aperiodic CSI trigger, UE 1500 checks the timer to determine whether the threshold time, T, has passed since 1011. As illustrated in FIG. 10D, the scheduled time for CSI reporting is beyond the threshold time, T. Therefore, at 1014, UE 1500 sends non-precoded #2 CSI report for non-precoded #2 CSI-RS, received at 1001, and beamformed CSI report at 1015 for beamformed CSI-RS, received at 1002.

Figure 11C:
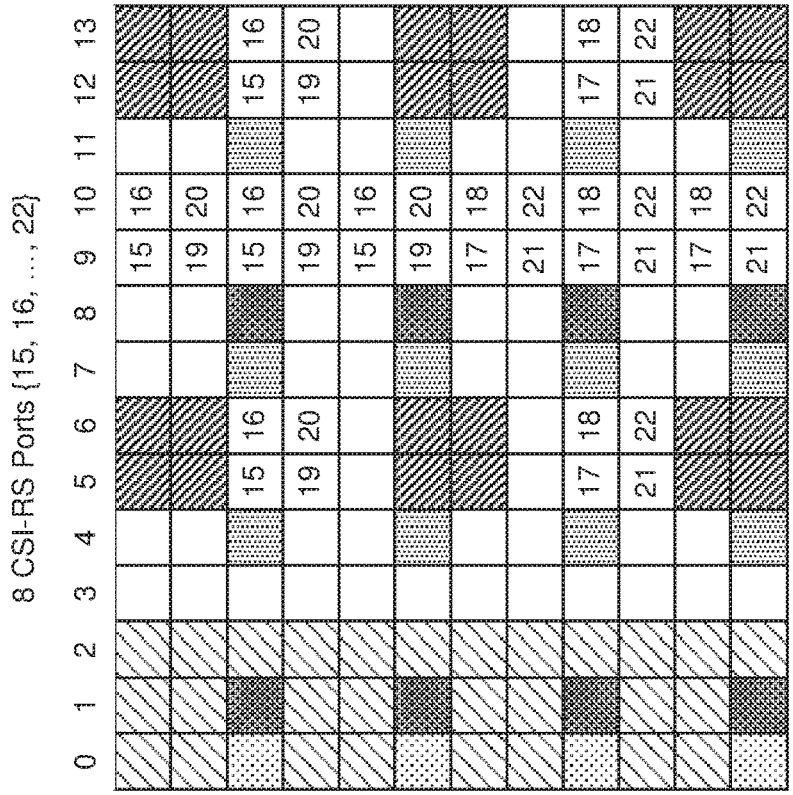

FIGS. 11A-11C are block diagrams illustrating a resource element (RE) map for transmissions of 2-port 1100, 4-port 1101, and 8-port 1102 CSI-RS resources. For beamformed CSI-RS resources 1100-1102, the codebook for beamformed CSI-RS is designed based on an antenna port selection and co-phasing with the following port pair used for PMI feedback: 2-port CSI-RS resource: pair of {15, 16}; 4-port CSI-RS resource: pairs of {15, 17} or {16, 18}; or 8-port CSI-RS resource: pairs of {15, 19}, {16, 20}, {17, 21}, {18, 22}. As illustrated in FIGS. 11A-11C, issues with existing CSI-RS port to RE mapping for beamformed CSI-RS resource can be seen in that the port pairs of 4-port beamformed CSI-RS resource 1101 occupies the REs of two 2-port CSI-RS resources 1100, and the port pairs of 8-port beamformed CSI-RS resource 1102 may use the REs of two 4-port CSI-RS resources 1101. This does not support partial CSI-RS resource multiplexing among multiple UEs configured with different numbers of CSI-RS ports. For a UE configured for 8-port CSI-RS, if only the port pair {15, 19} is used for PMI feedback, the REs of the unused pairs, e.g., {16, 20}, {17, 21}, {18, 22} cannot be reused for a 4-port CSI-RS resource configuration of another UE. As another example, for 4-port CSI-RS resource 1101, if only the port pair {15, 17} is used for PMI feedback, the REs of the unused pair, e.g., {16, 18} cannot be reused for a 2-port CSI-RS resource configuration.

Figure 12:
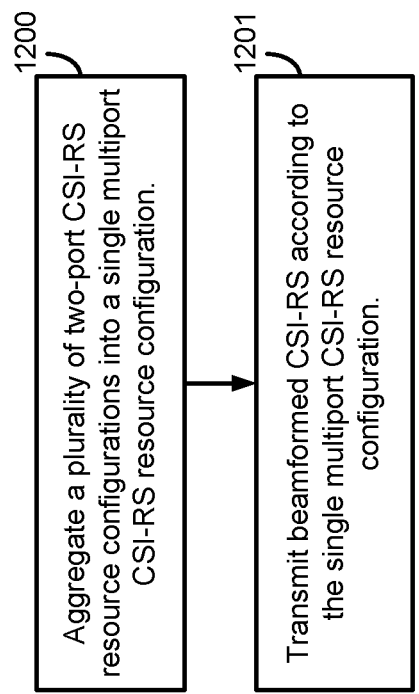
FIG. 12 is a block diagram illustrating example blocks executed to implement one aspect of the present disclosure.

FIG. 12 is a block diagram illustrating example blocks executed to implement one aspect of the present disclosure. At block 1200, a base station aggregates a plurality of two-port CSI-RS resource configurations into a single multiport CSI-RS resource configuration. For example, a base station, such as eNB 1400, executes resource aggregator 1406 stored in memory 242, to select the multiple two-port CSI-RS resource configurations into the single multiport CSI-RS resource configuration. At block 1201, the base station transmits beamformed CSI-RS according to the single multiport CSI-RS resource configuration. For example, eNB 1400 transmits the beamformed CSI-RS via wireless radios 1401a-t and antennas 234a-t. The various aspects of the described example of FIG. 12 improves the CSI-RS port to RE mapping for beamformed 4- and 8-ports CSI-RS resources. For example for beamformed CSI-RS, a 4-port or an 8-port CSI-RS resource configuration is formed by aggregating multiple 2-port CSI-RS resource configurations with the following port numbering.

$$p = \begin{Bmatrix} p' + k & \text{for } p' = 15 \\ p' + k + (K-1) & \text{for } p' = 16 \end{Bmatrix}$$

Where, p is the CSI-RS port number for a 4-port or 8-port CSI-RS resource, and p' is the CSI-RS port numbering within an aggregated 2-port CSI-RS resource configuration. The proposed 4-port and 8-port beamformed CSI-RS resource configurations and associated port numbering ensures the REs of any port pair corresponding to a 2-port CSI-RS resource to support reassigning unused port pairs of the beamformed CSI-RS resource.

Figure 13:
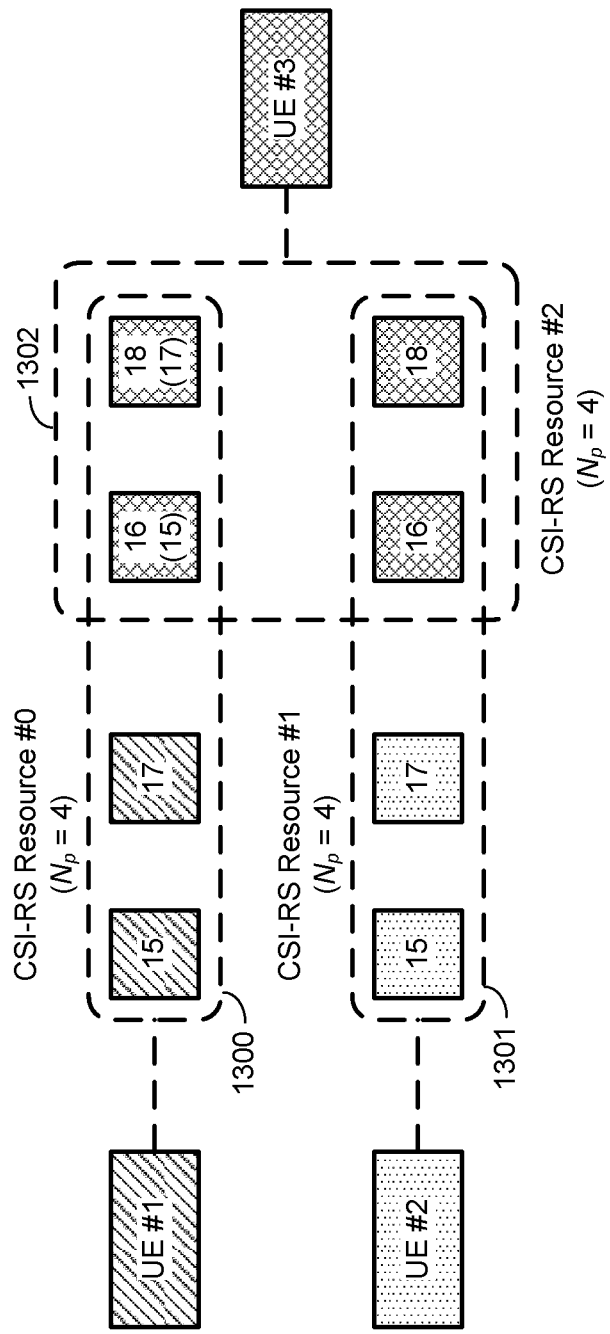
FIG. 13 is a block diagram illustrating three UEs configured for CSI-RS port to RE mapping according to one aspect of the present disclosure.

FIG. 13 is a block diagram illustrating three UEs configured for CSI-RS port to RE mapping according to one aspect of the present disclosure. As illustrated, the CSI processes for UEs 1-3 include CSI-RS resources 0-2, as configured by a base station (not shown) in communication with UEs 1-3. In the illustrated example implementation, CSI-RS resources 0-2 are each configured having 4-ports ($N_p$=4). While configured having 4-ports, CSI-RS resources 0-2, as configured according to various aspects of the present disclosure, are an aggregation of two 2-port CSI-RS resources. While allocating only eight REs (2×4=8), all three CSI-RS resources may be implemented, thus, saving four REs (3×4=12−8=4) over systems that do not employ the resource aggregation. For example, the resources for CSI-RS resource 2 are dynamically shared with the resources of CSI-RS resources 0 and 1.

For UE 1, CSI-RS resource 0 configures resource port pairs 1300 with four REs. However, UE 1 will only use REs 15 and 17 for PMI feedback, leaving REs 16 and 18 free. Similarly, for UE 2, CSI-RS resource 1 configures resource port pairs 1301 with four REs, of which UE 2 will only also use REs 15 and 17, leaving REs 16 and 18 free. With four free REs between CSI-RS resources 0 and 1, CSI-RS resource 2 is dynamically multiplexed with CSI-RS resource 0 and 1. Thus, UE 3, which transmits on all four REs, will have a first RE port pair 15 and 17, which were mapped to the unused REs 16 and 18 of CSI-RS resource 0, and a second RE port pair 16 and 18, which were also mapped to the unused REs 16 and 18 of CSI-RS resource 1. Without the dynamic aggregation of resources according to the various aspects of the present disclosure, the three CSI-RS resources 0-2 could only be shared using a time division multiplexing (TDM) operation in order to achieve the same CSI-RS overhead. In such TDM operations, for example, CSI-RS resource 0 and 1 may be used in subframe n, and CSI-RS resource 1 and 2 at subframe n+1, . . . , etc. However, this approach would means that some of UEs 1-3 may not measure CSI-RS at some subframes, which may degrade performance and user experience.

Those of skill in the art would understand that various aspects of the present disclosure may include different implementations, such as through non-transitory computer-readable media, which, when code stored thereon is executed by one or more computers or processors performs the features and functionality of the aspects, and such as through apparatuses that have one or more processors and memory coupled to the processors, such that when instructions are executed, the apparatus may be configured to perform the features and functionality of the aspects. The following statements reflect the various aspects of the present disclosure in different formats from the claims filed herewith.

In a first aspect, a non-transitory computer-readable medium having program code recorded thereon, the program code comprising:
  program code for causing a computer to configure a first channel state information (CSI) reference signal (CSI-RS) resource for non-precoded CSI-RS, wherein the first CSI-RS resource is associated with a CSI process;
  program code for causing the computer to configure a second CSI-RS resource for beamformed CSI-RS, wherein the second CSI-RS resource is also associated with the CSI process; and
  program code for causing the computer to transmit a non-precoded CSI-RS using the first CSI-RS resource and a beamformed CSI-RS using the second CSI-RS resource, wherein the transmitting is part of a hybrid CSI-RS operation.

In a non-transitory computer-readable medium according to the first aspect, a second aspect, further including:
  program code for causing the computer to determine a number of antenna ports associated with the first CSI-RS resource for non-precoded CSI-RS.

In a non-transitory computer-readable medium according to the first aspect, a third aspect, wherein the program code for causing the computer to determine includes one of:
  program code for causing the computer to determine the number of antenna ports according to:

$N=2 \times N_1 \times N_2$ for full CSI-RS, wherein N is the number of antenna ports, $N_1$ is the first total number of antenna ports in a first dimension of an antenna array of a base station, and $N_2$ is the second total number of antenna ports in a second dimension of the antenna array; or
  program code for causing the computer to determine the number of antenna ports according to:

$N=2 \times N_1 + N_2$ for partial CSI-RS.

In a non-transitory computer-readable medium according to the first aspect, a fourth aspect, further including:
  program code for causing the computer to configure a number of antenna ports associated with the second CSI-RS resource, wherein the number of antenna ports associated with the second CSI-RS resource is one of: 2, 4, or 8.

In a non-transitory computer-readable medium according to the first aspect, a fifth aspect, further including:
  program code for causing the computer to receive CSI feedback from a user equipment (UE), wherein the CSI feedback is based on the non-precoded CSI-RS; and
  program code for causing the computer to determine a set of precoding vectors for beamforming the beamformed CSI-RS of the second CSI-RS resource based on the CSI feedback.

In a non-transitory computer-readable medium according to the first aspect, a sixth aspect, further including:
  program code for causing the computer to configure the first and second CSI-RS resources independently according to one or more of:
    frequency resource mapping;
    time resource mapping;
    periodicity; and
    subframe offset.

In a non-transitory computer-readable medium according to the sixth aspect, a seventh aspect, further including:
  program code for causing the computer to detect a transmission collision between the non-precoded CSI-RS within the first CSI-RS resource and the beamformed CSI-RS within the second CSI-RS resource in one or a plurality of subframes, wherein the transmission collision is resolved according to a priority of a CSI-RS type of the non-precoded CSI-RS having priority over the beamformed CSI-RS; and
  program code for causing the computer to drop one of: the non-precoded CSI-RS or the beamformed CSI-RS, having lower priority in the one or plurality of subframes in which the transmission collision is detected.

A non-transitory computer-readable medium of any combination of the first through seventh aspects.

In an eighth aspect, a non-transitory computer-readable medium having program code recorded thereon, the program code comprising:
  program code for causing a computer to generate a first rank indicator and a first precoding matrix indicator based on measurement of a first channel state information (CSI) reference signal (CSI-RS) resource of a non-precoded CSI-RS in a CSI process;
  program code for causing the computer to transmit a first CSI report including one or more of: the first rank indicator and the first precoding matrix indicator, according to a first periodicity and offset;
  program code for causing the computer to generate a second rank indicator, a second precoding matrix indicator, and a channel quality indicator based on measurement of a second CSI-RS resource of a beamformed CSI-RS in the CSI process; and
  program code for causing the computer to transmit a second CSI report including one or more of: the second rank indicator, the second precoding matrix indicator, and the channel quality indicator, according to a second periodicity and offset.

In the non-transitory computer-readable medium according to the eighth aspect, a ninth aspect, wherein the second CSI-RS resource of a beamformed CSI-RS is configured without PMI feedback,
  wherein the second CSI report including one or more of: the second rank indicator, and the channel quality indicator,
  wherein the second RI and CQI are determined using precoder cycling within the codebook set associated with the beamformed CSI-RS.

In the non-transitory computer-readable medium according to the eighth aspect, a tenth aspect, further including:
program code for causing the computer to detect a reporting collision between the first CSI report and the second CSI report for periodic CSI reporting,
wherein the reporting collision is resolved according to a priority of a report based on measurement of the non-precoded CSI-RS over a report based on measurement of the beamformed CSI-RS.

In the non-transitory computer-readable medium according to the tenth aspect, an eleventh aspect, wherein the detected reporting collision is between the first CSI report and the second CSI report having a same reporting type,
wherein the reporting collision is resolved according to a priority of a report of the same reporting type based on measurement of the non-precoded CSI-RS over a report of the same reporting type based on measurement of the beamformed CSI-RS.

In the non-transitory computer-readable medium according to the tenth aspect, a twelfth aspect, wherein the CSI process is configured with two or more subframe sets, the priority having hierarchy of one of:
priority based on a reporting type having higher priority than priority based on CSI-RS type having higher priority than priority based on subframe set index; or
priority based on the reporting type having higher priority than priority based on the subframe set index having higher priority than priority based on CSI-RS type.

In the non-transitory computer-readable medium according to the eighth aspect, a thirteenth aspect, further including:
program code for causing the computer to receive an aperiodic CSI triggering signal from a base station;
program code for causing the computer to jointly transmit a first aperiodic CSI report based on measurement of the non-precoded CSI-RS and a second aperiodic CSI report based on measurement of the beamformed CSI-RS in a same subframe.

In the non-transitory computer-readable medium according to the thirteenth aspect, a fourteenth aspect, further including:
program code for causing the computer to jointly encode the first rank indicator based on measurement of the non-precoded CSI-RS and the second rank indicator based on measurement of the beamformed CSI-RS for transmission in the same subframe, and
program code for causing the computer to jointly encode the first precoding matrix indicator, the second precoding matrix indicator and a channel quality indicator.

In the non-transitory computer-readable medium according to the thirteenth aspect, a fifteenth aspect, further including:
program code for causing the computer to determine a last reporting of a previous CSI report based on measurement of the non-precoded CSI-RS,
wherein the first aperiodic CSI report is jointly transmitted with the second aperiodic CSI report when the last reporting exceeds a predetermined time threshold, and
wherein the previous CSI report is jointly transmitted with the second aperiodic CSI report when the last reporting fails to exceed the predetermined time threshold.

In the non-transitory computer-readable medium according to the fifteenth aspect, a sixteenth aspect, wherein the predetermined time threshold is one of:
fixed by a mobile operator; or
received in configuration signals received from the base station.

In the non-transitory computer-readable medium according to the eighth aspect, a seventeenth aspect, further including:
program code for causing the computer to receive an aperiodic CSI triggering signal from a base station, wherein the aperiodic CSI triggering signal identifies an aperiodic CSI report for reporting as one of:
a first aperiodic CSI report based on measurement of the non-precoded CSI-RS;
a second aperiodic CSI report based on measurement of the beamformed CSI-RS; or
both the first aperiodic CSI report and the second aperiodic CSI report; and
program code for causing the computer to transmit the aperiodic CSI report as identified by the aperiodic CSI triggering signal.

In the non-transitory computer-readable medium according to the eighth aspect, an eighteenth aspect, further including:
program code for causing the computer to determine the first precoding matrix indicator based on measurement of the non-precoded CSI-RS by using a codebook associated with non-precoded CSI-RS, wherein the first precoding matrix indicator is wideband.

In the non-transitory computer-readable medium according to the eighth aspect, a nineteenth aspect, further including:
program code for causing the computer to determine the second precoding matrix indicator based on measurement of the beamformed CSI-RS by using a codebook associated with beamformed CSI-RS, wherein the second precoding matrix is one of: wideband or subband.

In the non-transitory computer-readable medium according to the eighth aspect, a twentieth aspect, wherein one of:
the first and second periodicity and offset are configured independently by higher layer signaling from a base station; or
the first periodicity and offset are based on a periodicity factor received from the base station.

A non-transitory computer-readable medium of any combination of the eighth through twentieth aspects.

In a twenty-first aspect, a non-transitory computer-readable medium having program code recorded thereon, the program code comprising:
program code for causing a computer to aggregate a plurality of two-port channel state information (CSI) reference signal (CSI-RS) resource configurations into a single multiport CSI-RS resource configuration; and
program code for causing the computer to transmit beamformed CSI-RS according to the single multiport CSI-RS resource configuration.

In the non-transitory computer-readable medium according to the twenty-first aspect, a twenty-second aspect, wherein the program code for causing the computer to aggregate is performed according to:

$$p = \begin{Bmatrix} p' + k, & p' = 15 \\ p' + k + (K-1), & p' = 16 \end{Bmatrix}$$

where k=0, . . . , K−1, and
where p is a CSI-RS port number for the single multiport CSI-RS resource configuration, p' is a CSI-RS port number for the two-port CSI-RS resource configuration, and K is a total number of the two-port CSI-RS resource configuration in the single multiport CSI-RS resource configuration.

In a twenty-third aspect, an apparatus configured for wireless communication, the apparatus comprising:
at least one processor; and
a memory coupled to the at least one processor,
wherein the at least one processor is configured:
to configure a first channel state information (CSI) reference signal (CSI-RS) resource for non-precoded CSI-RS, wherein the first CSI-RS resource is associated with a CSI process;
to configure a second CSI-RS resource for beamformed CSI-RS, wherein the second CSI-RS resource is also associated with the CSI process; and
to transmit a non-precoded CSI-RS using the first CSI-RS resource and a beamformed CSI-RS using the second CSI-RS resource, wherein the transmitting is part of a hybrid CSI-RS operation.

In the apparatus according to the twenty-third aspect, a twenty-fourth aspect, further including configuration of the at least one processor to determine a number of antenna ports associated with the first CSI-RS resource for non-precoded CSI-RS.

In the apparatus according to the twenty-fourth aspect, a twenty-fifth aspect, wherein the configuration of the at least one processor to determine includes configuration to one of:
determine the number of antenna ports according to:

$$N=2\times N_1\times N_2$$

for full CSI-RS, wherein N is the number of antenna ports, $N_1$ is the first total number of antenna ports in a first dimension of an antenna array of a base station, and $N_2$ is the second total number of antenna ports in a second dimension of the antenna array; or
determine the number of antenna ports according to:

$$N=2\times N_1+N_2$$

for partial CSI-RS.

In the apparatus according to the twenty-third aspect, a twenty-sixth aspect, further including configuration of the at least one processor to configure a number of antenna ports associated with the second CSI-RS resource, wherein the number of antenna ports associated with the second CSI-RS resource is one of: 2, 4, or 8.

In the apparatus according to the twenty-third aspect, a twenty-seventh aspect, further including configuration of the at least one processor:
to receive CSI feedback from a user equipment (UE), wherein the CSI feedback is based on the non-precoded CSI-RS; and
to determine a set of precoding vectors for beamforming the beamformed CSI-RS of the second CSI-RS resource based on the CSI feedback.

In the apparatus according to the twenty-third aspect, a twenty-eighth aspect, further including configuration of the at least one processor:
to configure the first and second CSI-RS resources independently according to one or more of:
frequency resource mapping;
time resource mapping;
periodicity; and
subframe offset.

In the apparatus according to the twenty-eighth aspect, a twenty-ninth aspect, further including configuration of the at least one processor:

to detect a transmission collision between the non-precoded CSI-RS within the first CSI-RS resource and the beamformed CSI-RS within the second CSI-RS resource in one or a plurality of subframes, wherein the transmission collision is resolved according to a priority of a CSI-RS type of the non-precoded CSI-RS having priority over the beamformed CSI-RS; and
to drop one of: the non-precoded CSI-RS or the beamformed CSI-RS, having lower priority in the one or plurality of subframes in which the transmission collision is detected.

The apparatus of any combination of the twenty-third through twenty-ninth aspects.

In a thirtieth aspect, an apparatus configured for wireless communication, the apparatus comprising:
at least one processor; and
a memory coupled to the at least one processor,
wherein the at least one processor is configured:
to generate a first rank indicator and a first precoding matrix indicator based on measurement of a first channel state information (CSI) reference signal (CSI-RS) resource of a non-precoded CSI-RS in a CSI process;
to transmit a first CSI report including one or more of: the first rank indicator and the first precoding matrix indicator, according to a first periodicity and offset;
to generate a second rank indicator, a second precoding matrix indicator, and a channel quality indicator based on measurement of a second CSI-RS resource of a beamformed CSI-RS in the CSI process; and
to transmit a second CSI report including one or more of: the second rank indicator, the second precoding matrix indicator, and the channel quality indicator, according to a second periodicity and offset.

In the apparatus according to the thirtieth aspect, a thirty-first aspect, wherein the second CSI-RS resource of a beamformed CSI-RS is configured without PMI feedback,
wherein the second CSI report including one or more of: the second rank indicator, and the channel quality indicator,
wherein the second RI and CQI are determined using precoder cycling within the codebook set associated with the beamformed CSI-RS.

In the apparatus according to the thirtieth aspect, a thirty-second aspect, further including configuration of the at least one processor to detect a reporting collision between the first CSI report and the second CSI report for periodic CSI reporting,
wherein the reporting collision is resolved according to a priority of a report based on measurement of the non-precoded CSI-RS over a report based on measurement of the beamformed CSI-RS.

In the apparatus according to the thirty-second aspect, a thirty-third aspect, wherein the detected reporting collision is between the first CSI report and the second CSI report having a same reporting type,
wherein the reporting collision is resolved according to a priority of a report of the same reporting type based on measurement of the non-precoded CSI-RS over a report of the same reporting type based on measurement of the beamformed CSI-RS.

In the apparatus according to the thirty-second aspect, a thirty-fourth aspect, wherein the CSI process is configured with two or more subframe sets, the priority having hierarchy of one of:

priority based on a reporting type having higher priority than priority based on CSI-RS type having higher priority than priority based on subframe set index; or priority based on the reporting type having higher priority than priority based on the subframe set index having higher priority than priority based on CSI-RS type.

In the apparatus according to the thirtieth aspect, a thirty-fifth aspect, further including configuration of the at least one processor:

to receive an aperiodic CSI triggering signal from a base station;

to jointly transmit a first aperiodic CSI report based on measurement of the non-precoded CSI-RS and a second aperiodic CSI report based on measurement of the beamformed CSI-RS in a same subframe.

In the apparatus according to the thirty-fifth aspect, a thirty-sixth aspect, further including configuration of the at least one processor:

to jointly encode the first rank indicator based on measurement of the non-precoded CSI-RS and the second rank indicator based on measurement of the beamformed CSI-RS for transmission in the same subframe, and to jointly encode the first precoding matrix indicator, the second precoding matrix indicator and a channel quality indicator.

In the apparatus according to the thirty-fifth aspect, a thirty-seventh aspect, further including configuration of the at least one processor to determine a last reporting of a previous CSI report based on measurement of the non-precoded CSI-RS, wherein the first aperiodic CSI report is jointly transmitted with the second aperiodic CSI report when the last reporting exceeds a predetermined time threshold, and wherein the previous CSI report is jointly transmitted with the second aperiodic CSI report when the last reporting fails to exceed the predetermined time threshold.

In the apparatus according to the thirty-seventh aspect, a thirty-eighth aspect, wherein the predetermined time threshold is one of:

fixed by a mobile operator; or received in configuration signals received from the base station.

In the apparatus according to the thirtieth aspect, a thirty-ninth aspect, further including configuration of the at least one processor:

to receive an aperiodic CSI triggering signal from a base station, wherein the aperiodic CSI triggering signal identifies an aperiodic CSI report for reporting as one of:

a first aperiodic CSI report based on measurement of the non-precoded CSI-RS;

a second aperiodic CSI report based on measurement of the beamformed CSI-RS; or both the first aperiodic CSI report and the second aperiodic CSI report; and to transmit the aperiodic CSI report as identified by the aperiodic CSI triggering signal.

In the apparatus according to the thirtieth aspect, a fortieth aspect, further including configuration of the at least one processor to determine the first precoding matrix indicator based on measurement of the non-precoded CSI-RS by using a codebook associated with non-precoded CSI-RS, wherein the first precoding matrix indicator is wideband.

In the apparatus according to the thirtieth aspect, a forty-first aspect, further including configuration of the at least one processor to determine the second precoding matrix indicator based on measurement of the beamformed CSI-RS by using a codebook associated with beamformed CSI-RS, wherein the second precoding matrix is one of: wideband or subband.

In the apparatus according to the thirtieth aspect, a forty-second aspect, wherein one of:

the first and second periodicity and offset are configured independently by higher layer signaling from a base station; or the first periodicity and offset are based on a periodicity factor received from the base station.

The apparatus of any combination of the thirtieth through forty-second aspects.

In a forty-third aspect, an apparatus configured for wireless communication, the apparatus comprising:

at least one processor; and a memory coupled to the at least one processor, wherein the at least one processor is configured:

to aggregate a plurality of two-port channel state information (CSI) reference signal (CSI-RS) resource configurations into a single multiport CSI-RS resource configuration; and to transmit beamformed CSI-RS according to the single multiport CSI-RS resource configuration.

In the apparatus according to the forty-third aspect, a forty-fourth aspect, wherein the configuration of the at least one processor to aggregate is performed according to:

$$p = \begin{Bmatrix} p' + k, & p' = 15 \\ p' + k + (K-1), & p' = 16 \end{Bmatrix}$$

where k=0, . . . , K−1, and where p is a CSI-RS port number for the single multiport CSI-RS resource configuration, p' is a CSI-RS port number for the two-port CSI-RS resource configuration, and K is a total number of the two-port CSI-RS resource configuration in the single multiport CSI-RS resource configuration.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules described herein may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented through computer-executable instructions in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   configuring a first channel state information (CSI) reference signal (CSI-RS) resource for non-precoded CSI-RS, wherein the first CSI-RS resource is associated with a CSI process;
   configuring a second CSI-RS resource for beamformed CSI-RS, wherein the second CSI-RS resource is also associated with the CSI process;
   transmitting an aperiodic CSI trigger;
   transmitting a non-precoded CSI-RS using the first CSI-RS resource and a beamformed CSI-RS using the second CSI-RS resource, wherein the transmitting is part of a hybrid CSI-RS operation; and
   receiving, in response to the aperiodic CSI trigger, aperiodic CSI feedback including at least one or both of a non-precoded (NP) CSI report based on the non-precoded CSI-RS and a beamformed (BF) CSI report based on the beamformed CSI-RS,
   wherein the NP CSI report, scheduled to be transmitted by the aperiodic CSI trigger, is dropped based at least on whether a previous NP CSI report has been transmitted within a time window of a scheduled transmission time identified by the aperiodic CSI trigger.

2. The method of claim 1, further including:
   determining a number of antenna ports associated with the first CSI-RS resource for non-precoded CSI-RS.

3. The method of claim 2, wherein the determining includes one of:
   determining the number of antenna ports according to:

$$N = 2 \times N_1 \times N_2$$

for full CSI-RS, wherein N is the number of antenna ports, $N_1$ is the first total number of antenna ports in a first dimension of an antenna array of a base station, and $N_2$ is the second total number of antenna ports in a second dimension of the antenna array; or determining the number of antenna ports according to:

$N = 2 \times N_1 + N_2$ for partial CSI-RS.

4. The method of claim 1, further including:
configuring a number of antenna ports associated with the second CSI-RS resource, wherein the number of antenna ports associated with the second CSI-RS resource is one of: 2, 4, or 8.

5. The method of claim 1, further including:
determining a set of precoding vectors for beamforming the beamformed CSI-RS of the second CSI-RS resource based on the CSI feedback.

6. The method of claim 1, further including:
configuring the first and second CSI-RS resources independently according to one or more of:
frequency resource mapping;
time resource mapping;
periodicity; and
subframe offset.

7. The method of claim 1, wherein the time window is based on a predetermined threshold time to the scheduled transmission time identified by the aperiodic CSI trigger.

8. A method of wireless communication, comprising:
receiving an aperiodic channel state information (CSI) trigger;
receiving a non-precoded (NP) CSI reference signal (CSI-RS) on a first CSI-RS resource associated with a CSI process;
receiving a beamformed (BF) CSI-RS on a second CSI-RS resource associated with the CSI process, as part of a hybrid CSI-RS operation;
determining whether a previous NP CSI report has been transmitted within a time window of a scheduled transmission time identified by the aperiodic CSI trigger; and
transmitting, in response to the aperiodic CSI trigger, aperiodic CSI feedback including at least one or both of an NP CSI report based on the non-precoded CSI-RS and a BF CSI report based on the beamformed CSI-RS,
wherein the NP CSI report, scheduled to be transmitted by the aperiodic CSI trigger, is dropped based at least on said determination of whether the previous NP CSI report has been transmitted within the time window of the scheduled transmission time identified by the aperiodic CSI trigger.

9. The method of claim 8, wherein the NP CSI report includes a first rank indicator and a first precoding matrix indicator (PMI) and the BF CSI report includes a second rank indicator, a second PMI, and a channel quality indicator (CQI).

10. The method of claim 8, wherein the aperiodic CSI trigger comprises one or more bits in downlink control information (DCI) signaling whether to transmit either or both of the NP CSI report and the BF CSI report.

11. The method of claim 9, further including:
determining the first precoding matrix indicator based on measurement of the non-precoded CSI-RS by using a codebook associated with non-precoded CSI-RS, wherein the first precoding matrix indicator is wideband.

12. The method of claim 9, further including:
determining the second precoding matrix indicator based on measurement of the beamformed CSI-RS by using a codebook associated with beamformed CSI-RS, wherein the second precoding matrix is one of: wideband or subband.

13. An apparatus configured for wireless communication, comprising:
means for receiving an aperiodic channel state information (CSI) trigger;
means for receiving a non-precoded (NP) CSI reference signal (CSI-RS) on a first CSI-RS resource associated with a CSI process;
means for receiving a beamformed (BF) CSI-RS on a second CSI-RS resource associated with the CSI process, as part of a hybrid CSI-RS operation;
means for determining whether a previous NP CSI report has been transmitted within a time window of a scheduled transmission time identified by the aperiodic CSI trigger; and
means for transmitting, in response to the aperiodic CSI trigger, aperiodic CSI feedback including at least one or both of an NP CSI report based on the non-precoded CSI-RS and a BF CSI report based on the beamformed CSI-RS,
wherein the NP CSI report, scheduled to be transmitted by the aperiodic CSI trigger, is dropped based at least on said determination of whether the previous NP CSI report has been transmitted within the time window of the scheduled transmission time identified by the aperiodic CSI trigger.

14. The apparatus of claim 13, wherein the NP CSI report includes a first rank indicator and a first precoding matrix indicator (PMI) and the BF CSI report includes a second rank indicator, a second PMI, and a channel quality indicator (CQI).

15. The apparatus of claim 13, wherein the aperiodic CSI trigger comprises one or more bits in downlink control information (DCI) signaling whether to transmit either or both of the NP CSI report and the BF CSI report.

16. The apparatus of claim 14, further including:
means for determining the first precoding matrix indicator based on measurement of the non-precoded CSI-RS by using a codebook associated with non-precoded CSI-RS, wherein the first precoding matrix indicator is wideband.

17. The apparatus of claim 14, further including:
means for determining the second precoding matrix indicator based on measurement of the beamformed CSI-RS by using a codebook associated with beamformed CSI-RS, wherein the second precoding matrix is one of: wideband or subband.

* * * * *